(12) United States Patent
Wang et al.

(10) Patent No.: US 12,235,519 B2
(45) Date of Patent: Feb. 25, 2025

(54) OPTICAL IMAGING LENS ASSEMBLY

(71) Applicant: Zhejiang Sunny Optics Co., Ltd, Yuyao (CN)

(72) Inventors: Jian Wang, Yuyao (CN); Yanling Guo, Yuyao (CN); Lingbo He, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 466 days.

(21) Appl. No.: 17/544,450

(22) Filed: Dec. 7, 2021

(65) Prior Publication Data

US 2022/0206257 A1 Jun. 30, 2022

(30) Foreign Application Priority Data

Dec. 29, 2020 (CN) .......................... 202011600724.1

(51) Int. Cl.
*G02B 9/64* (2006.01)
*G02B 13/00* (2006.01)

(52) U.S. Cl.
CPC ............ *G02B 9/64* (2013.01); *G02B 13/0045* (2013.01)

(58) Field of Classification Search
CPC ....... G02B 9/64; G02B 13/0045; G02B 13/04
See application file for complete search history.

(56) References Cited

U.S. PATENT DOCUMENTS 6,172,819 B1  1/2001 Enomoto et al.
2020/0132969 A1* 4/2020 Huang .............. H01L 27/14627

FOREIGN PATENT DOCUMENTS

| CN | 106896473 A |   | 6/2017 |   |             |
|----|-------------|---|--------|---|-------------|
| CN | 107703609 A |   | 2/2018 |   |             |
| CN | 108445610 A | * | 8/2018 | … | G02B 13/0045 |
| CN | 110068915 A |   | 7/2019 |   |             |
| CN | 110646917 A |   | 1/2020 |   |             |
| CN | 110927929 A |   | 3/2020 |   |             |
| CN | 111061037 A |   | 4/2020 |   |             |
| CN | 213780518 U |   | 7/2021 |   |             |

OTHER PUBLICATIONS

Machine Translation of CN108445610 (Year: 2018).*
Notice of Allowance issued in corresponding application CN112596211A, dated Dec. 9, 2024, 5 pages.

* cited by examiner

*Primary Examiner* — Alicia M Harrington
(74) *Attorney, Agent, or Firm* — Reising Ethington P.C.

(57) ABSTRACT

An optical imaging lens assembly having, sequentially along an optical axis from an object side to an image side, a first lens, having a positive refractive power, an object-side surface of the first lens being a concave surface; a second lens, having a negative refractive power, an image-side surface of the second lens being a convex surface; a third lens, having a refractive power; a fourth lens, having a refractive power; a fifth lens, having a refractive power; a sixth lens, having a refractive power; a seventh lens, having a refractive power; and an eighth lens, having a refractive power.

17 Claims, 9 Drawing Sheets

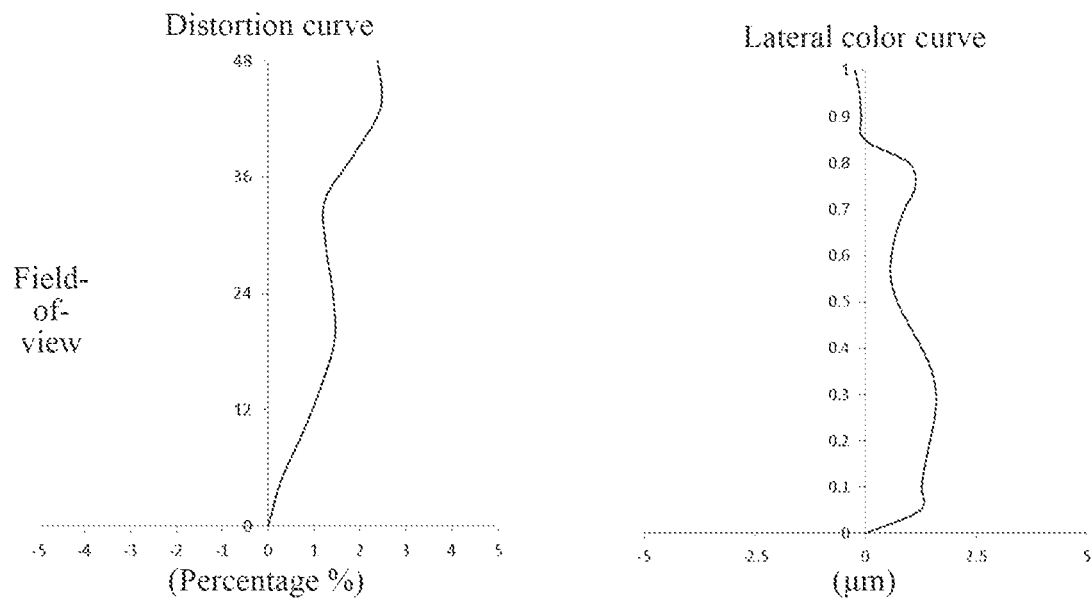
Fig. 2C
Fig. 2D
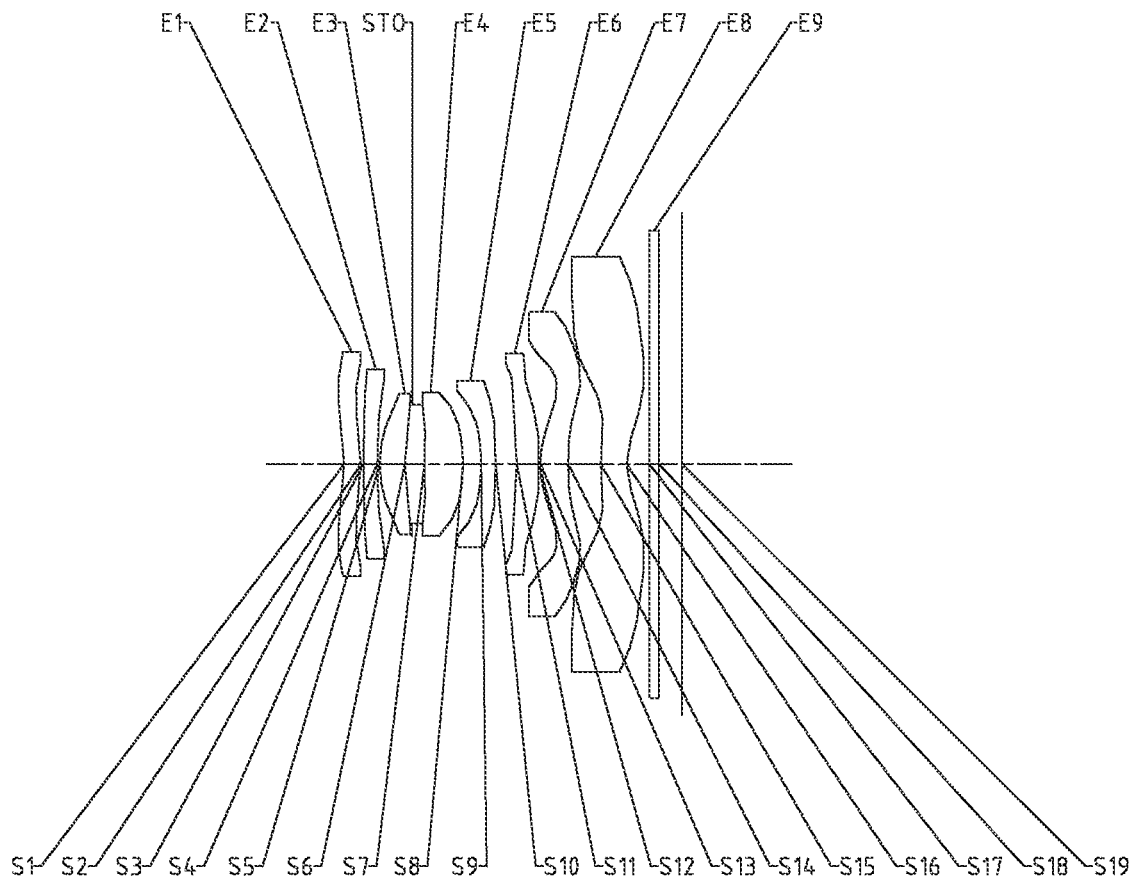
Fig. 3

OPTICAL IMAGING LENS ASSEMBLY

CROSS-REFERENCE TO RELATED APPLICATIONS

This application claims the priority from Chinese Patent Application No. 202011600724.1, filed in the National Intellectual Property Administration (CNIPA) on Dec. 29, 2020, the content of which is hereby incorporated by reference in its entirety.

TECHNICAL FIELD

The present disclosure relates to the field of optical element, and specifically to an optical imaging lens assembly comprising eight lenses.

BACKGROUND

In recent years, with the rapid development and popularization of portable electronic products, a smart phone has become an entertainment device carried by everyone. The photograph performance (e.g., pixels, an imaging quality and a resolution) of the imaging lens assembly mounted on the smart phone has also been significantly improved. Accordingly, the trend of replacing a conventional camera with a mobile phone camera has become increasingly prominent.

At the same time, along with the development trend of the portable electronic products, the optical camera lens assembly mounted on the portable electronic products is required to be lighter and thinner, and also required to ensure a good imaging quality. The photosensitive device of an optical lens assembly is usually a charge coupled device (CCD) or a complementary metal-oxide semiconductor sensor (CMOS Sensor).

SUMMARY

The present disclosure provides an optical imaging lens assembly, comprising, sequentially along an optical axis from an object side to an image side: a first lens, having a positive refractive power, an object-side surface of the first lens being a concave surface; a second lens, having a negative refractive power, an image-side surface of the second lens being a convex surface; a third lens, having a refractive power; a fourth lens, having a refractive power; a fifth lens, having a refractive power; a sixth lens, having a refractive power; a seventh lens, having a refractive power; and an eighth lens, having a refractive power.

In an implementation, $|ODT|<2.6\%$, wherein ODT is an optical distortion of the optical imaging lens assembly.

In an implementation, $-6.5<f1/f2<-1.5$, wherein f1 is an effective focal length of the first lens, and f2 is an effective focal length of the second lens.

In an implementation, $1.5<R4/f3<3.5$, wherein R4 is a radius of curvature of the image-side surface of the second lens, and f3 is an effective focal length of the third lens.

In an implementation, $2.0<f4/R5<3.5$, wherein f4 is an effective focal length of the fourth lens, and R5 is a radius of curvature of an object-side surface of the third lens.

In an implementation, $1.0<f6/R11<2.0$, wherein f6 is an effective focal length of the sixth lens, and R11 is a radius of curvature of an object-side surface of the sixth lens.

In an implementation, $1.0<f/f7<1.5$, wherein f is a total effective focal length of the optical imaging lens assembly, and f7 is an effective focal length of the seventh lens.

In an implementation, $-4.0<f8/R16<-2.5$, wherein f8 is an effective focal length of the eighth lens, and R16 is a radius of curvature of an image-side surface of the eighth lens.

In an implementation, $1.0<R9/R8<3.5$, wherein R8 is a radius of curvature of an image-side surface of the fourth lens, and R9 is a radius of curvature of an object-side surface of the fifth lens.

In an implementation, $3.0<R13/CT7<3.5$, wherein R13 is a radius of curvature of an object-side surface of the seventh lens, and CT7 is a center thickness of the seventh lens along the optical axis.

In an implementation, $-12.0<R11/CT6<-7.0$, wherein R11 is the radius of curvature of the object-side surface of the sixth lens, and CT6 is a center thickness of the sixth lens along the optical axis.

In an implementation, $2.0<R7/R6<4.0$, wherein R6 is a radius of curvature of an image-side surface of the third lens, and R7 is a radius of curvature of an object-side surface of the fourth lens.

In an implementation, $1.5<T78/T56<2.1$, wherein T56 is a spacing distance between the fifth lens and the sixth lens along the optical axis, and T78 is a spacing distance between the seventh lens and the eighth lens along the optical axis.

In an implementation, $2.0<CT4/CT5<3.0$, wherein CT4 is a center thickness of the fourth lens along the optical axis, and CT5 is a center thickness of the fifth lens along the optical axis.

In an implementation, $3.0<TTL/\Sigma AT<4.0$, wherein TTL is a distance from the object-side surface of the first lens to an image plane of the optical imaging lens assembly along the optical axis, and $\Sigma AT$ is a sum of spacing distances between any two adjacent lenses in the first lens to the eighth lens along the optical axis.

In an implementation, $f/EPD<2.1$, wherein f is the total effective focal length of the optical imaging lens assembly, and EPD is an entrance pupil diameter of the optical imaging lens assembly.

In an implementation, $FOV \geq 90°$, wherein FOV is a maximal field-of-view of the optical imaging lens assembly.

In an implementation, $ImgH \geq 5.0$ mm, wherein ImgH is half of a diagonal length of an effective pixel area on the image plane of the optical imaging lens assembly.

BRIEF DESCRIPTION OF THE DRAWINGS

In combination with the accompanying drawings, other features, objectives and advantages of the present disclosure will become more apparent through the following detailed description for non-limiting embodiments. In the accompanying drawings:

FIGS. 2A-2D respectively show a longitudinal aberration curve, an astigmatic curve, a distortion curve and a lateral color curve of the optical imaging lens assembly according to Embodiment 1;

FIG. 3 is a schematic structural diagram of an optical imaging lens assembly according to Embodiment 2 of the present disclosure;

DETAILED DESCRIPTION OF EMBODIMENTS

Figure 1:
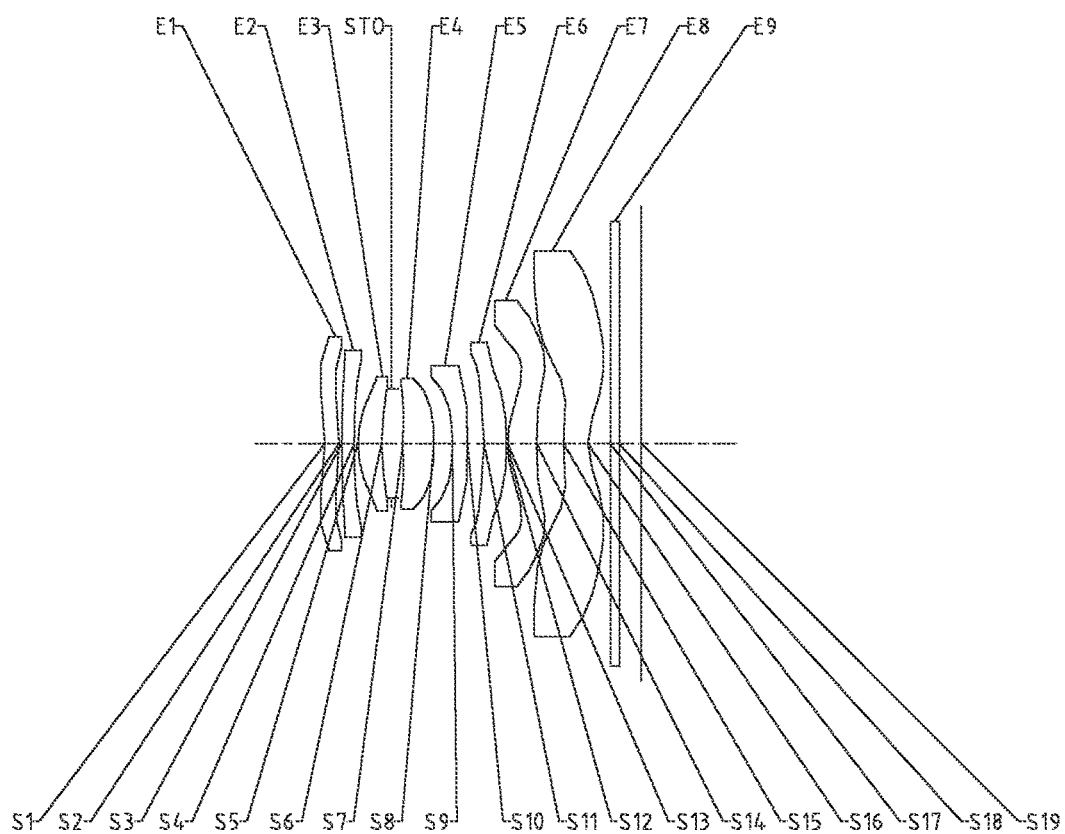
FIG. 1 is a schematic structural diagram of an optical imaging lens assembly according to Embodiment 1 of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses are slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, a paraxial area refers to an area near an optical axis. If a lens surface is a convex surface and the position of the convex surface is not defined, it represents that the lens surface is a convex surface at least at the paraxial area. If the lens surface is a concave surface and the position of the concave surface is not defined, it represents that the lens surface is a concave surface at least at the paraxial area. A surface of each lens that is closest to a photographed object is referred to as the object-side surface of the lens, and a surface of the each lens that is closest to an image side is referred to as the image-side surface of the lens.

It should be further understood that the terms "comprise," "comprising," "having," "include" and/or "including," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Features, principles and other aspects of the present disclosure are described below in detail.

An optical imaging lens assembly according to exemplary implementations of the present disclosure may include eight lenses having refractive powers, which are respectively a first lens, a second lens, a third lens, a fourth lens, a fifth lens, a sixth lens, a seventh lens and an eighth lens. The first to eighth lenses are arranged in sequence along an optical axis of the optical imaging lens assembly from an object side to an image side. Any two adjacent lenses in the first to eighth lenses may have an air spacing.

In the exemplary implementations, the first lens may have a positive refractive power, and an object-side surface of the first lens is a concave surface. The second lens may have a negative refractive power, and an image-side surface of the second lens is a convex surface. The third lens may have a refractive power. The fourth lens may have a refractive power. The fifth lens may have a refractive power. The sixth lens may have a refractive power. The seventh lens may have a refractive power. The eighth lens may have a refractive power. The first lens has the positive refractive power and the object-side surface of the first lens is the concave surface, and accordingly, it can be ensured that the first lens has a good processability, and the optical imaging lens assembly has the advantage of a large field-of-view. The second lens has the negative power and the image-side surface of the second lens is the convex surface, and accordingly, the tolerance sensitivity of the optical imaging lens assembly can be effectively reduced.

In the exemplary implementations, the optical imaging lens assembly according to the present disclosure may satisfy: |ODT|<2.6%. Here, ODT is an optical distortion of the optical imaging lens assembly. By reasonably configuring the structure of the lens assembly, the optical distortion of the optical imaging lens assembly over the entire field of view is not more than 2.6%. The reasonable control for the optical distortion of the optical imaging lens assembly is conducive to reducing the degree of deformation of a photographed object in an image.

In the exemplary implementations, the optical imaging lens assembly according to the present disclosure may satisfy: $-6.5<f1/f2<-1.5$. Here, f1 is an effective focal length of the first lens, and f2 is an effective focal length of the second lens. The refractive powers of the first lens and the second lens are reasonably configured, which is conducive to sharing a large object field of view and correcting the off-axis aberration of the lens on the image side of the second lens, thereby improving the imaging quality of the optical imaging lens assembly.

In the exemplary implementations, the optical imaging lens assembly according to the present disclosure may satisfy: $1.5<R4/f3<3.5$. Here, R4 is a radius of curvature of the image-side surface of the second lens, and f3 is an effective focal length of the third lens. The ratio of the radius of curvature of the image-side surface of the second lens to the effective focal length of the third lens is controlled within a reasonable range, which is conducive to reducing the introduction of spherical aberration, thereby improving the imaging quality of the optical imaging lens assembly. Alternatively, R4 and f3 may satisfy $1.8<R4/f3<3.3$.

In the exemplary implementations, the optical imaging lens assembly according to the present disclosure may satisfy: $2.0<f4/R5<3.5$. Here, f4 is an effective focal length of the fourth lens, and R5 is a radius of curvature of an object-side surface of the third lens. Satisfying $2.0<f4/R5<3.5$ is conducive to balancing the imaging quality of the optical imaging lens assembly and the assembly tolerance sensitivity of the third lens and the fourth lens, to obtain a high imaging quality in a situation where the assembly tolerance sensitivity of the third lens and the fourth lens is reduced as much as possible. For example, f4 and R5 may satisfy $2.3<f4/R5<3.2$. Alternatively, the fourth lens may have a positive refractive power, and the object-side surface of the third lens may be a convex surface.

In the exemplary implementations, the optical imaging lens assembly according to the present disclosure may satisfy: $1.0<f6/R11<2.0$. Here, f6 is an effective focal length of the sixth lens, and R11 is a radius of curvature of an object-side surface of the sixth lens. Satisfying $1.0<f6/R11<2.0$ is conducive to controlling the amount of the field curvature that the object-side surface of the sixth lens contributes within a reasonable range. For example, f6 and R11 may satisfy $1.3<f6/R11<1.9$. Alternatively, the sixth lens may have a negative refractive power, and the object-side surface of the sixth lens may be a concave surface.

In the exemplary implementations, the optical imaging lens assembly according to the present disclosure may satisfy: $1.0<f/f7<1.5$. Here, f is a total effective focal length of the optical imaging lens assembly, and f7 is an effective focal length of the seventh lens. The reasonable control for the effective focal length of the seventh lens is conducive to reducing the deflection angle of the light in the optical imaging lens assembly, thereby reducing the sensitivity of the optical imaging lens assembly. Alternatively, the seventh lens may have a positive refractive power.

In the exemplary implementations, the optical imaging lens assembly according to the present disclosure may satisfy: $-4.0<f8/R16<-2.5$. Here, f8 is an effective focal length of the eighth lens, and R16 is a radius of curvature of an image-side surface of the eighth lens. The ratio of the effective focal length of the eighth lens to the radius of curvature of the image-side surface of the eighth lens is controlled within a reasonable range, which is conducive to compensating the coma aberration caused by the lens at the front end of the optical imaging lens assembly, and thus, the optical imaging lens assembly has a good imaging quality. For example, f8 and R16 may satisfy $-3.8<f8/R16<-2.8$. Alternatively, the eighth lens may have a negative refractive power, and the image-side surface of the eighth lens may be a concave surface.

In the exemplary implementations, the optical imaging lens assembly according to the present disclosure may satisfy: $1.0<R9/R8<3.5$. Here, R8 is a radius of curvature of an image-side surface of the fourth lens, and R9 is a radius of curvature of an object-side surface of the fifth lens. By satisfying $1.0<R9/R8<3.5$, the spherical aberration of the optical imaging lens assembly can be effectively eliminated, thereby obtaining a high-definition image. Alternatively, the image-side surface of the fourth lens may be a convex surface, and the object-side surface of the fifth lens may be a concave surface.

In the exemplary implementations, the optical imaging lens assembly according to the present disclosure may satisfy: $3.0<R13/CT7<3.5$. Here, R13 is a radius of curvature of an object-side surface of the seventh lens, and CT7 is a center thickness of the seventh lens along the optical axis. Satisfying $3.0<R13/CT7<3.5$ is conducive to reducing the difficulty in injection molding process of the seventh lens, such that the seventh lens is easily injection molded, thereby improving the processability of the optical imaging lens assembly. Alternatively, the object-side surface of the seventh lens may be a convex surface.

In the exemplary implementations, the optical imaging lens assembly according to the present disclosure may satisfy: $-12.0<R11/CT6<-7.0$. Here, R11 is the radius of curvature of the object-side surface of the sixth lens, and CT6 is a center thickness of the sixth lens along the optical axis. Satisfying $-12.0<R11/CT6<-7.0$ is conducive to ensuring that the sixth lens has a good processability. Alternatively, the object-side surface of the sixth lens may be a concave surface.

In the exemplary implementations, the optical imaging lens assembly according to the present disclosure may satisfy: $2.0<R7/R6<4.0$. Here, R6 is a radius of curvature of an image-side surface of the third lens, and R7 is a radius of curvature of an object-side surface of the fourth lens. By satisfying $2.0<R7/R6<4.0$, the optical imaging lens assembly can well match the chief ray angle of the photosensitive chip of the image plane of the optical imaging lens assembly. Alternatively, the image-side surface of the third lens may be a concave surface, and the object-side surface of the fourth lens may be a convex surface.

In the exemplary implementations, the optical imaging lens assembly according to the present disclosure may satisfy: $3.0<TTL/\Sigma AT<4.0$. Here, TTL is a distance from the object-side surface of the first lens to the image plane of the optical imaging lens assembly along the optical axis, and $\Sigma AT$ is a sum of spacing distances between any two adjacent lenses in the first lens to the eighth lens along the optical axis. Satisfying $3.0<TTL/\Sigma AT<4.0$ is conducive to reasonably controlling the distortion of the optical imaging lens assembly. For example, TTL and $\Sigma AT$ may satisfy $3.2<TTL/\Sigma AT<3.8$.

In the exemplary implementations, the optical imaging lens assembly according to the present disclosure may satisfy: $1.5<T78/T56<2.1$. Here, T56 is a spacing distance between the fifth lens and the sixth lens along the optical axis, and T78 is a spacing distance between the seventh lens and the eighth lens along the optical axis. Satisfying $1.5<T78/T56<2.1$ is conducive to reducing the thickness sensitivity of the optical imaging lens assembly and to correcting the field curvature.

In the exemplary implementations, the optical imaging lens assembly according to the present disclosure may satisfy: 2.0<CT4/CT5<3.0. Here, CT4 is a center thickness of the fourth lens along the optical axis, and CT5 is a center thickness of the fifth lens along the optical axis. Satisfying 2.0<CT4/CT5<3.0 is conducive to controlling the amount of distortion that each field of view of the optical imaging lens assembly contributes within a reasonable range, thereby improving the imaging quality of the optical imaging lens assembly.

In the exemplary implementations, the optical imaging lens assembly according to the present disclosure may satisfy: f/EPD<2.1. Here, f is the total effective focal length of the optical imaging lens assembly, and EPD is an entrance pupil diameter of the optical imaging lens assembly. When the F-number of the optical imaging lens assembly is less than 2, the characteristics of the large aperture of the optical imaging lens assembly can be realized. For example, f and EPD may satisfy 1.7<f/EPD<1.9.

In the exemplary implementations, the optical imaging lens assembly according to the present disclosure may satisfy: FOV≥90°. Here, FOV is a maximal field-of-view of the optical imaging lens assembly. Satisfying FOV≥90° is conducive to causing the optical imaging lens assembly to obtain a large field of view, thereby improving the capability of the optical imaging lens assembly to collect object information.

In the exemplary implementations, the optical imaging lens assembly according to the present disclosure may satisfy: ImgH≥5.0 mm. Here, ImgH is half of a diagonal length of an effective pixel area on the image plane of the optical imaging lens assembly. Satisfying ImgH≥5.0 mm is conducive to achieving the imaging effect of the large image plane of the optical imaging lens assembly. For example, 5.2 mm≤ImgH≤6.0 mm.

In the exemplary implementations, the optical imaging lens assembly according to the present disclosure may further include a diaphragm disposed between the third lens and the fourth lens. Alternatively, the above optical imaging lens assembly may further include an optical filter for correcting color deviations and/or a protective glass for protecting a photosensitive element on the image plane.

The optical imaging lens assembly according to the above implementations of the present disclosure may use a plurality of lenses, for example, the above eight lenses. By reasonably distributing the refractive powers and the surface types of the lenses, the center thicknesses of the lenses, the axial spacings between the lenses, etc., it is possible to effectively reduce the size of the optical imaging lens assembly and improve the processability of the optical imaging lens assembly, which is more conducive to the production and processing of the optical imaging lens assembly, thus making the optical imaging lens assembly applicable to portable electronic products. Through the above configuration, the optical imaging lens assembly can have characteristics such as a high imaging quality and a large field-of-view.

In the implementations of the present disclosure, at least one of the surfaces of the lenses is an aspheric surface. That is, at least one of the surfaces from the object-side surface of the first lens to the image-side surface of the eighth lens is an aspheric surface. The aspheric lens is characterized in that the curvature continuously changes from the center of the lens to the periphery. Different from a spherical lens having a constant curvature from the center of the lens to the periphery, the aspheric lens has a better radius-of-curvature characteristic, and has advantages of improving the distortion aberration (i.e., improving the astigmatic aberration). The use of the aspheric lens can eliminate as much as possible the aberrations that occur during the imaging, thereby improving the imaging quality. Alternatively, at least one of the object-side surface and the image-side surface of each of the first lens, the second lens, the third lens, the fourth lens, the fifth lens, the sixth lens, the seventh lens and the eighth lens is an aspheric surface. Alternatively, the object-side surface and the image-side surface of each of the first lens, the second lens, the third lens, the fourth lens, the fifth lens, the sixth lens, the seventh lens and the eighth lens are aspheric surfaces.

However, it should be understood by those skilled in the art that the various results and advantages described in the present specification may be obtained by changing the number of the lenses constituting the optical imaging lens assembly without departing from the technical solution claimed by the present disclosure. For example, although the optical imaging lens assembly having eight lenses is described as an example in the implementations, the optical imaging lens assembly is not limited to the eight lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram of the optical imaging lens assembly according to Embodiment 1 of the present disclosure.

As shown in FIG. 1, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a convex surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

Table 1 shows basic parameters of the optical imaging lens assembly in Embodiment 1. Here, the units of a radius of curvature, a thickness/distance and a focal length are millimeters (mm).

TABLE 1

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| S1 | aspheric | −4.7766 | 0.3300 | 1.55 | 56.1 | 437.50 | 0.3055 |
| S2 | aspheric | −4.7972 | 0.0566 | | | | 1.8776 |
| S3 | aspheric | 36.1176 | 0.2900 | 1.67 | 20.4 | −72.08 | 99.0000 |
| S4 | aspheric | 20.5520 | 0.0818 | | | | 98.7692 |
| S5 | aspheric | 2.4033 | 0.5337 | 1.55 | 56.1 | 8.55 | −2.1763 |
| S6 | aspheric | 4.5660 | 0.2196 | | | | −3.5255 |
| STO | spherical | infinite | 0.2663 | | | | |
| S7 | aspheric | 17.8330 | 0.7082 | 1.55 | 56.1 | 7.41 | 18.1423 |
| S8 | aspheric | −5.1583 | 0.4097 | | | | −2.7961 |
| S9 | aspheric | −7.9123 | 0.3500 | 1.68 | 19.2 | −14.09 | −1.6151 |
| S10 | aspheric | −47.1679 | 0.3835 | | | | 99.0000 |
| S11 | aspheric | −4.6002 | 0.5022 | 1.57 | 37.4 | −8.67 | −0.2938 |
| S12 | aspheric | −69.7209 | 0.0300 | | | | 99.0000 |
| S13 | aspheric | 2.2691 | 0.6548 | 1.55 | 56.1 | 3.76 | −12.5123 |
| S14 | aspheric | −19.5556 | 0.6210 | | | | 28.6231 |
| S15 | aspheric | 3.8069 | 0.5500 | 1.54 | 55.7 | −4.50 | −33.1928 |
| S16 | aspheric | 1.4038 | 0.5056 | | | | −0.9869 |
| S17 | spherical | infinite | 0.2100 | 1.52 | 64.2 | | |
| S18 | spherical | infinite | 0.4970 | | | | |
| S19 | spherical | infinite | | | | | |

In this example, a total effective focal length f of the optical imaging lens assembly is 4.69 mm, and a total track length TTL of the optical imaging lens assembly (i.e., a distance from the object-side surface S1 of the first lens E1 to the image plane S19 of the optical imaging lens assembly along an optical axis) is 7.20 mm. Half of a diagonal length ImgH of an effective pixel area on the image plane S19 of the optical imaging lens assembly is 5.35 mm. Half of a maximal field-of-view Semi-FOV of the optical imaging lens assembly is 48.0°.

In Embodiment 1, the object-side surface and the image-side surface of any lens in the first to eighth lenses E1-E8 are both aspheric surfaces, and the surface type x of an aspheric lens may be defined using, but not limited to, the following formula:

$$x = \frac{ch^2}{1 + \sqrt{1 - (k+1)c^2h^2}} + \sum A_i h^i. \quad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient; and $A_i$ is the correction coefficient of an i-th order of the aspheric surface. Table 2 shows the high-order coefficients A4, A6, A8, A10, A12, A14, A16, A18 and A20 applicable to the aspheric surfaces S1-S16 in Embodiment 1.

TABLE 2

| surface number | A4 | A6 | A8 | A10 | A12 |
|---|---|---|---|---|---|
| S1 | 6.3700E−01 | −2.7619E−02 | 4.3819E−03 | −1.7556E−03 | −5.5919E−04 |
| S2 | 4.8017E−01 | −1.9718E−02 | 3.6758E−03 | −1.0666E−03 | −3.8026E−04 |
| S3 | −4.8573E−03 | −7.3203E−04 | 1.4404E−03 | −1.0595E−04 | 9.2299E−05 |
| S4 | 2.2494E−02 | 2.0091E−03 | −1.0746E−03 | 1.3098E−03 | 3.8324E−04 |
| S5 | 1.2226E−02 | −9.9229E−03 | −1.6799E−03 | 1.4548E−03 | 8.5384E−04 |
| S6 | −5.6682E−02 | 2.5982E−03 | 8.0821E−04 | 5.7826E−04 | 2.2575E−04 |
| S7 | −7.5771E−02 | −4.6591E−03 | −2.2831E−04 | 2.5167E−06 | 2.0233E−05 |
| S8 | −2.1286E−01 | −7.4856E−03 | −1.7696E−03 | −6.5046E−04 | −4.4967E−05 |
| S9 | −3.1150E−01 | 1.5806E−02 | 8.4611E−04 | −1.8196E−03 | 5.9459E−05 |
| S10 | −2.0961E−01 | 2.4006E−02 | 9.7405E−03 | 1.5440E−03 | 1.6205E−03 |
| S11 | 2.6063E−01 | −1.1856E−01 | 9.2729E−03 | 2.3974E−03 | −2.0632E−03 |
| S12 | −6.0702E−01 | 2.5300E−01 | −7.0781E−02 | 2.2875E−02 | −7.0891E−03 |
| S13 | −1.4368E+00 | 1.7555E−01 | 2.3963E−02 | −1.2399E−01 | −1.4889E−02 |
| S14 | −1.4780E−01 | −4.4298E−01 | 2.5645E−01 | −1.9219E−01 | 9.9502E−02 |
| S15 | −1.9166E+00 | 9.4447E−01 | −4.7385E−01 | 1.9910E−01 | −2.2562E−02 |
| S16 | −1.0766E+01 | 2.3225E+00 | −8.6872E−01 | 3.5410E−01 | −1.2621E−01 |

TABLE 2-continued

| surface number | A14 | A16 | A18 | A20 |
|---|---|---|---|---|
| S1 | −9.3166E−05 | −5.3956E−05 | −2.2053E−05 | 2.3252E−05 |
| S2 | 7.0466E−05 | −5.7721E−05 | −2.0854E−07 | 1.3736E−05 |
| S3 | 7.6227E−05 | −6.5170E−05 | 3.5185E−05 | −3.6264E−07 |
| S4 | 7.7447E−05 | 5.7673E−05 | 3.9223E−05 | 2.0623E−06 |
| S5 | 2.7239E−04 | 3.8039E−05 | 2.8430E−06 | −6.3713E−06 |
| S6 | 4.3950E−05 | 6.4975E−06 | −1.5543E−07 | 3.0337E−06 |
| S7 | 6.9221E−06 | 7.7776E−06 | 1.6030E−06 | 2.7162E−06 |
| S8 | −2.8591E−06 | 2.2890E−05 | 6.8117E−06 | 4.9112E−06 |
| S9 | 1.0410E−05 | −5.1583E−05 | −2.2568E−06 | −8.1475E−06 |
| S10 | 1.7956E−04 | −2.0599E−05 | 2.9810E−05 | −1.8212E−05 |
| S11 | −3.7881E−03 | −3.0168E−03 | −9.1395E−04 | −3.1551E−04 |
| S12 | −8.1460E−04 | 2.6534E−03 | 2.2626E−03 | 8.9456E−04 |
| S13 | 1.9606E−02 | 1.8757E−02 | −1.5944E−02 | −4.1843E−03 |
| S14 | −1.8410E−02 | 1.0220E−02 | −1.6474E−02 | 1.9586E−03 |
| S15 | −2.1563E−03 | 1.9065E−02 | −5.7902E−03 | −2.4917E−03 |
| S16 | 7.8994E−02 | −1.5227E−02 | 2.6293E−02 | −7.7920E−03 |

Figures 2A, 2B:
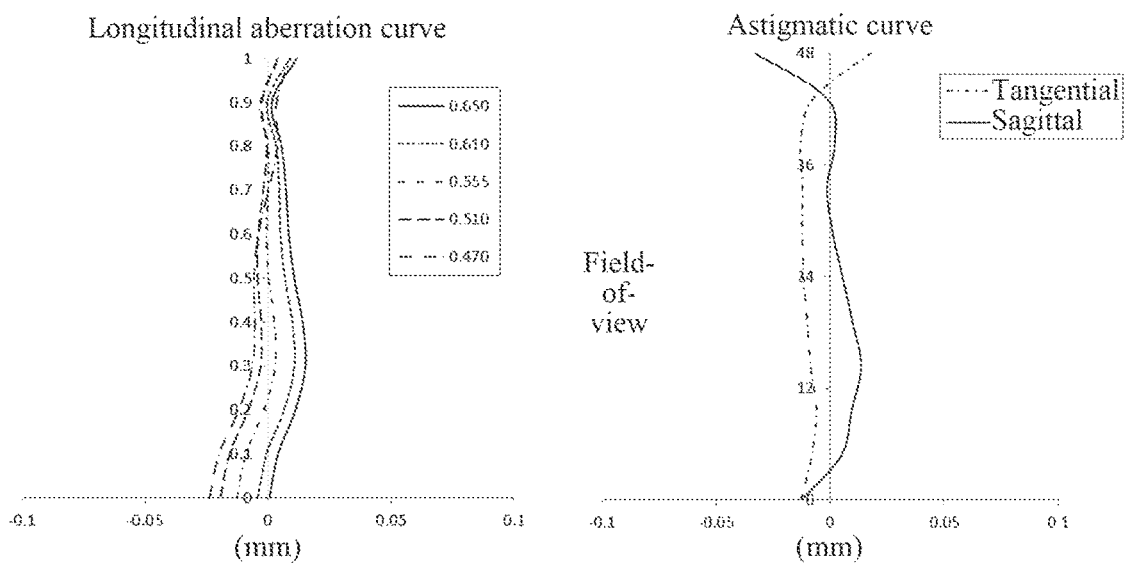

FIG. 2A illustrates a longitudinal aberration curve of the optical imaging lens assembly according to Embodiment 1, representing deviations of focal points of light of different wavelengths converged after passing through the lens assembly. FIG. 2B illustrates an astigmatic curve of the optical imaging lens assembly according to Embodiment 1, representing a curvature of a tangential image plane and a curvature of a sagittal image plane. FIG. 2C illustrates a distortion curve of the optical imaging lens assembly according to Embodiment 1, representing amounts of distortion corresponding to different fields-of-view. FIG. 2D illustrates a lateral color curve of the optical imaging lens assembly according to Embodiment 1, representing deviations of different image heights on the image plane after light passes through the lens assembly. It can be seen from FIGS. 2A-2D that the optical imaging lens assembly given in Embodiment 1 can achieve a good imaging quality.

Embodiment 2

An optical imaging lens assembly according to Embodiment 2 of the present disclosure is described below with reference to FIGS. 3-4D. In this embodiment and the following embodiments, for the sake of brevity, some descriptions similar to those in Embodiment 1 will be omitted. FIG. 3 is a schematic structural diagram of the optical imaging lens assembly according to Embodiment 2 of the present disclosure.

As shown in FIG. 3, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total effective focal length f of the optical imaging lens assembly is 4.61 mm, and a total track length TTL of the optical imaging lens assembly is 7.20 mm. Half of a diagonal length ImgH of an effective pixel area on the image plane S19 of the optical imaging lens assembly is 5.35 mm. Half of a maximal field-of-view Semi-FOV of the optical imaging lens assembly is 48.9°.

Table 3 shows basic parameters of the optical imaging lens assembly in Embodiment 2. Here, the units of a radius of curvature, a thickness/distance and a focal length are millimeters (mm). Table 4 shows the high-order coefficients A4, A6, A8, A10, A12, A14, A16, A18 and A20 applicable to the aspheric surfaces S1-S16 in Embodiment 2. Here, the surface type of each aspheric surface may be defined using the formula (1) given in Embodiment 1.

TABLE 3

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| S1 | aspheric | −4.4013 | 0.3481 | 1.55 | 56.1 | 226.03 | 0.4802 |
| S2 | aspheric | −4.3685 | 0.0648 | | | | 1.7765 |
| S3 | aspheric | 38.5638 | 0.2958 | 1.67 | 20.4 | −61.07 | 81.6174 |
| S4 | aspheric | 19.7426 | 0.0500 | | | | 97.1558 |
| S5 | aspheric | 2.5844 | 0.5337 | 1.55 | 56.1 | 9.35 | −2.0884 |
| S6 | aspheric | 4.8511 | 0.1513 | | | | −4.4652 |
| STO | spherical | infinite | 0.2670 | | | | |
| S7 | aspheric | 15.9349 | 0.8206 | 1.55 | 56.1 | 6.73 | 25.1920 |
| S8 | aspheric | −4.6923 | 0.3863 | | | | −4.5161 |
| S9 | aspheric | −6.4380 | 0.3100 | 1.68 | 19.2 | −12.83 | −4.3399 |
| S10 | aspheric | −25.3785 | 0.4508 | | | | 99.0000 |
| S11 | aspheric | −5.3964 | 0.4721 | 1.57 | 37.4 | −7.85 | −1.8424 |
| S12 | aspheric | 27.0501 | 0.0300 | | | | −67.8764 |
| S13 | aspheric | 1.9126 | 0.5963 | 1.55 | 56.1 | 3.68 | −11.3718 |
| S14 | aspheric | 35.0007 | 0.6942 | | | | −99.0000 |
| S15 | aspheric | 3.3757 | 0.5500 | 1.54 | 55.7 | −4.82 | −29.0562 |
| S16 | aspheric | 1.3806 | 0.4887 | | | | −0.9760 |
| S17 | spherical | infinite | 0.2100 | 1.52 | 64.2 | | |
| S18 | spherical | infinite | 0.4802 | | | | |
| S19 | spherical | infinite | | | | | |

TABLE 4

| surface number | A4 | A6 | A8 | A10 | A12 |
|---|---|---|---|---|---|
| S1 | 6.2530E−01 | −3.3077E−02 | 1.3262E−03 | −1.2651E−03 | −6.5526E−04 |
| S2 | 4.9534E−01 | −2.0013E−02 | 2.5758E−03 | −6.2498E−04 | −3.0354E−04 |
| S3 | −3.2002E−03 | −6.2027E−04 | 2.9326E−03 | 8.8274E−05 | 3.4397E−04 |
| S4 | 2.1117E−02 | 1.3161E−03 | 1.0489E−03 | 1.7026E−03 | 1.2123E−03 |
| S5 | 1.3967E−02 | −7.1807E−03 | −1.1708E−03 | 1.2811E−03 | 1.0459E−03 |
| S6 | −5.9657E−02 | 3.5116E−03 | 4.1069E−04 | 3.2787E−04 | 1.3245E−04 |
| S7 | −7.5605E−02 | −3.4103E−03 | 3.0705E−05 | 6.1892E−05 | 3.2675E−05 |
| S8 | −2.0642E−01 | −4.7235E−03 | −8.6793E−04 | −4.0815E−04 | 3.2466E−05 |
| S9 | −3.0683E−01 | 1.4748E−02 | 2.0174E−02 | −1.4734E−03 | 3.6671E−04 |
| S10 | −2.1555E−01 | 2.2103E−02 | 1.0001E−02 | 6.0920E−04 | 1.7861E−03 |
| S11 | 2.9821E−01 | −1.0491E−01 | 7.4975E−04 | −1.0006E−02 | −3.1341E−03 |
| S12 | −6.1821E−01 | 2.6607E−01 | −7.9355E−02 | 1.5590E−02 | −7.9927E−03 |
| S13 | −1.4063E+00 | 1.6593E−01 | 2.4120E−01 | −1.4376E−01 | −1.3308E−02 |
| S14 | −5.4386E−01 | −3.4244E−01 | 2.2367E−01 | −1.6531E−01 | 9.5148E−02 |
| S15 | −1.8884E+00 | 9.4651E−01 | −4.8015E−01 | 2.0617E−01 | −3.2405E−02 |
| S16 | −1.0861E+01 | 2.3508E+00 | −8.7499E−01 | 3.5306E−01 | −1.4556E−01 |

| surface number | A14 | A16 | A18 | A20 |
|---|---|---|---|---|
| S1 | −3.3514E−05 | −6.1381E−05 | 5.7904E−06 | 1.5798E−05 |
| S2 | 3.9497E−05 | −5.5336E−05 | 6.0177E−06 | 1.0511E−05 |
| S3 | 3.3376E−05 | −2.2194E−05 | 2.9977E−05 | 9.1913E−06 |
| S4 | 2.4577E−04 | 2.1965E−04 | 7.4718E−05 | 5.1381E−05 |
| S5 | 3.1280E−04 | 8.1671E−05 | −1.2739E−05 | −7.7655E−06 |
| S6 | 3.7796E−05 | 7.6422E−06 | −3.0785E−06 | 1.9896E−06 |
| S7 | 1.0281E−05 | 5.0594E−06 | 1.1386E−06 | 2.6309E−07 |
| S8 | −6.5805E−07 | 1.3257E−05 | 5.7347E−08 | 3.6427E−06 |
| S9 | 2.8401E−05 | −1.4932E−05 | −4.9422E−06 | −1.6545E−06 |
| S10 | 1.0609E−04 | 9.5967E−05 | 2.9648E−05 | 1.2961E−05 |
| S11 | −1.6018E−03 | −5.6728E−04 | −2.0995E−04 | −6.1585E−05 |
| S12 | 2.1871E−03 | 3.2292E−04 | 4.3516E−05 | −1.0936E−04 |
| S13 | 2.5629E−02 | 1.7834E−02 | −1.5837E−02 | −4.7709E−03 |
| S14 | −2.3459E−02 | 6.2326E−03 | −1.1640E−02 | 2.1116E−03 |
| S15 | −2.0720E−03 | 2.0910E−02 | −5.4056E−03 | −8.7793E−04 |
| S16 | 7.8431E−02 | −1.6776E−02 | 2.9737E−02 | −3.8347E−03 |

Figure 4A:
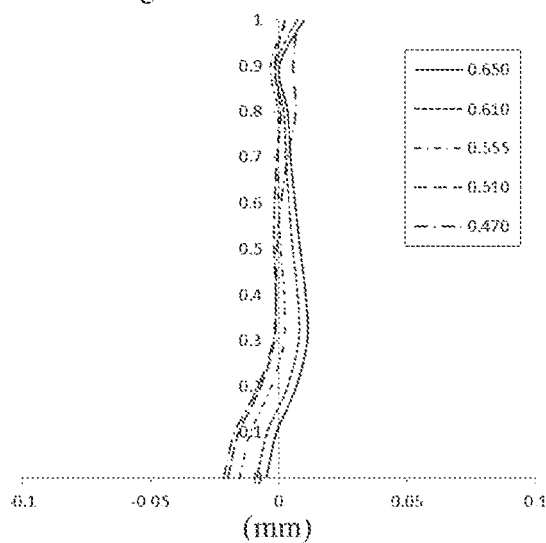
FIGS. 4A-4D respectively show a longitudinal aberration curve, an astigmatic curve, a distortion curve and a lateral color curve of the optical imaging lens assembly according to Embodiment 2.
Figure 4B:
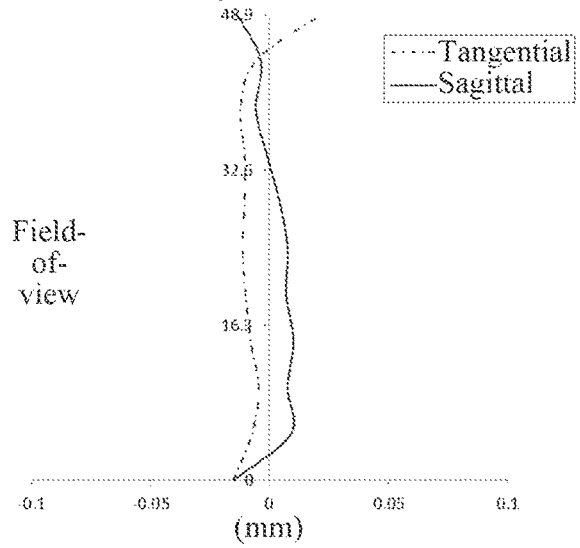
Figure 4C:
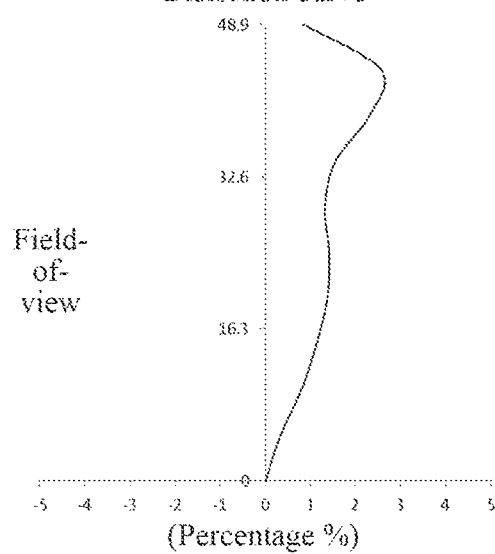
Figure 4D:
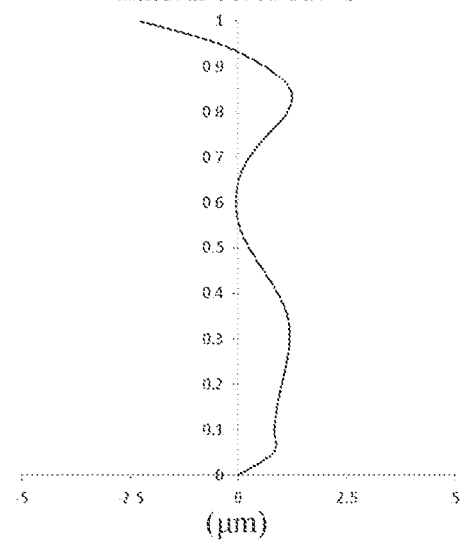

FIG. 4A illustrates a longitudinal aberration curve of the optical imaging lens assembly according to Embodiment 2, representing deviations of focal points of light of different wavelengths converged after passing through the lens assembly. FIG. 4B illustrates an astigmatic curve of the optical imaging lens assembly according to Embodiment 2, representing a curvature of a tangential image plane and a curvature of a sagittal image plane. FIG. 4C illustrates a distortion curve of the optical imaging lens assembly according to Embodiment 2, representing amounts of distortion corresponding to different fields-of-view. FIG. 4D illustrates a lateral color curve of the optical imaging lens assembly according to Embodiment 2, representing deviations of different image heights on the image plane after light passes through the lens assembly. It can be seen from FIGS. 4A-4D that the optical imaging lens assembly given in Embodiment 2 can achieve a good imaging quality.

Embodiment 3

Figure 5:
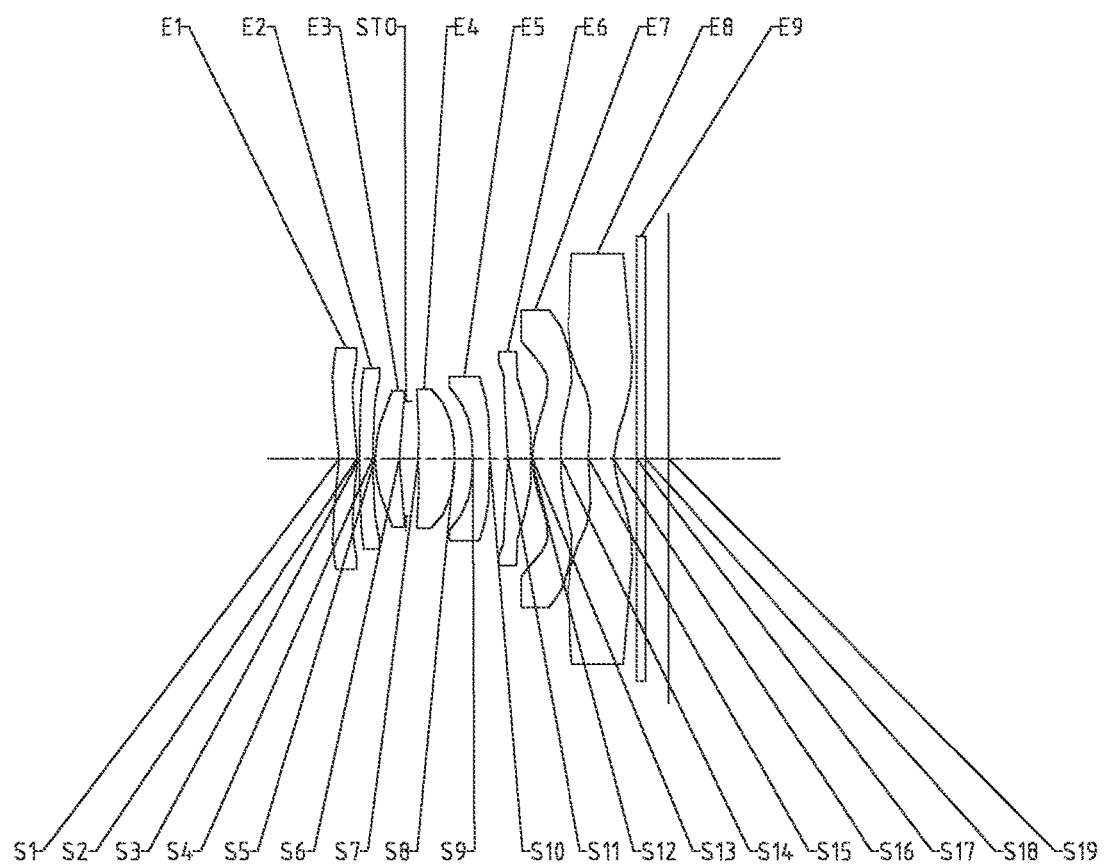
FIG. 5 is a schematic structural diagram of an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram of the optical imaging lens assembly according to Embodiment 3 of the present disclosure.

As shown in FIG. 5, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total effective focal length f of the optical imaging lens assembly is 4.52 mm, and a total track length TTL of the optical imaging lens assembly is 7.25 mm. Half of a diagonal length ImgH of an effective pixel area on the image plane S19 of the optical imaging lens assembly is 5.35 mm. Half of a maximal field-of-view Semi-FOV of the optical imaging lens assembly is 49.2°.

Table 5 shows basic parameters of the optical imaging lens assembly in Embodiment 3. Here, the units of a radius of curvature, a thickness/distance and a focal length are millimeters (mm). Table 6 shows the high-order coefficients A4, A6, A8, A10, A12, A14, A16, A18 and A20 applicable to the aspheric surfaces S1-S16 in Embodiment 3. Here, the surface type of each aspheric surface may be defined using the formula (1) given in Embodiment 1.

TABLE 5

| surface number | surface type | radius of curvature | thickness/ distance | material refractive index | abbe number | focal length | conic coefficient |
|---|---|---|---|---|---|---|---|
| OBJ | spherical | Infinite | infinite | | | | |
| S1 | aspheric | −4.2329 | 0.3990 | 1.55 | 56.1 | 230.00 | 0.5191 |
| S2 | aspheric | −4.2312 | 0.0500 | | | | 1.7343 |
| S3 | aspheric | 34.0310 | 0.2900 | 1.67 | 20.4 | −66.62 | 98.8726 |
| S4 | aspheric | 19.2005 | 0.0500 | | | | 98.8345 |
| S5 | aspheric | 2.6626 | 0.5337 | 1.55 | 56.1 | 9.93 | −2.4614 |
| S6 | aspheric | 4.8604 | 0.1424 | | | | −5.3370 |
| STO | spherical | infinite | 0.2734 | | | | |
| S7 | aspheric | 12.5643 | 0.7987 | 1.55 | 56.1 | 6.41 | 24.6595 |
| S8 | aspheric | −4.7421 | 0.3941 | | | | −4.0157 |
| S9 | aspheric | −6.7242 | 0.3800 | 1.68 | 19.2 | −12.60 | −4.4818 |
| S10 | aspheric | −32.4984 | 0.4000 | | | | 99.0000 |
| S11 | aspheric | −5.0238 | 0.5008 | 1.57 | 37.4 | −7.61 | −3.2874 |
| S12 | aspheric | 32.7957 | 0.0300 | | | | 99.0000 |
| S13 | aspheric | 1.9916 | 0.6300 | 1.55 | 56.1 | 3.52 | −12.4291 |
| S14 | aspheric | −50.0000 | 0.6115 | | | | −99.0000 |
| S15 | aspheric | 3.2003 | 0.5500 | 1.54 | 55.7 | −4.71 | −20.8937 |
| S16 | aspheric | 1.3278 | 0.5075 | | | | −0.9712 |
| S17 | spherical | infinite | 0.2100 | 1.52 | 64.2 | | |
| S18 | spherical | infinite | 0.4989 | | | | |
| S19 | spherical | infinite | | | | | |

TABLE 6

| surface number | A4 | A6 | A8 | A10 | A12 |
|---|---|---|---|---|---|
| S1 | 6.2141E−01 | −3.3470E−02 | 1.7809E−03 | −7.5805E−04 | −4.3654E−04 |
| S2 | 5.0085E−01 | −2.1155E−02 | 2.5038E−03 | −5.8716E−04 | −1.9405E−04 |
| S3 | 3.0378E−03 | 3.2352E−04 | 3.3276E−03 | 3.8162E−04 | 3.9766E−04 |
| S4 | 2.0868E−02 | 3.1222E−03 | 1.4142E−03 | 1.9064E−03 | 1.3122E−03 |
| S5 | 3.0552E−03 | −1.0530E−02 | −2.0318E−03 | 9.3648E−04 | 9.6101E−04 |

TABLE 6-continued

| | | | | | |
|---|---|---|---|---|---|
| S6 | −6.2110E−02 | 3.3494E−03 | 2.1924E−04 | 2.6643E−04 | 1.1265E−04 |
| S7 | −7.5324E−02 | −3.0956E−03 | 1.2714E−05 | 6.0856E−05 | 2.7454E−05 |
| S8 | −2.0804E−01 | −3.9379E−03 | −9.5650E−04 | −3.9961E−04 | 3.0853E−05 |
| S9 | −3.0620E−01 | 1.6666E−02 | 2.3230E−03 | −1.3961E−03 | 2.9324E−04 |
| S10 | −2.1134E−01 | 1.6158E−02 | 1.1169E−02 | 7.9402E−04 | 1.7822E−03 |
| S11 | 3.2780E−01 | −1.0418E−01 | −2.7138E−03 | −9.3147E−03 | −3.3647E−03 |
| S12 | −6.1232E−01 | 2.6887E−01 | −8.1629E−02 | 1.6059E−02 | −6.6463E−03 |
| S13 | −1.3924E+00 | 1.7077E−01 | 2.3558E−01 | −1.5285E−01 | −1.0454E−02 |
| S14 | −1.4974E+00 | −4.8075E−01 | 2.4076E−01 | −1.7388E−01 | 1.0327E−01 |
| S15 | −1.7461E+00 | 9.2387E−01 | −4.6893E−01 | 2.0959E−01 | −4.5021E−02 |
| S16 | −1.0931E+01 | 2.4516E+00 | −8.5829E−01 | 3.6474E−01 | −1.4477E−01 |

| surface number | A14 | A16 | A18 | A20 |
|---|---|---|---|---|
| S1 | 2.6450E−05 | −4.8875E−05 | 6.9261E−06 | 9.8839E−06 |
| S2 | 4.2359E−05 | −4.2891E−05 | 5.7044E−06 | 8.2804E−06 |
| S3 | 1.0844E−05 | 9.2433E−06 | 1.9931E−05 | 1.4117E−05 |
| S4 | 3.0065E−04 | 2.5710E−04 | 5.3987E−05 | 5.0658E−05 |
| S5 | 3.2203E−04 | 1.2884E−04 | 8.0803E−06 | −2.9027E−06 |
| S6 | 3.5489E−05 | 1.2781E−05 | −4.0230E−07 | 2.7155E−06 |
| S7 | 8.0876E−06 | 2.9078E−06 | 1.2765E−06 | −1.7718E−07 |
| S8 | −8.7789E−07 | 1.0613E−05 | −5.6436E−07 | 2.1702E−06 |
| S9 | 4.6963E−05 | −2.7363E−05 | −2.7063E−06 | −1.4513E−06 |
| S10 | 2.0784E−04 | 9.0837E−05 | 4.9521E−05 | 1.4438E−05 |
| S11 | −9.9199E−04 | −6.2312E−04 | −1.3047E−04 | −5.3854E−05 |
| S12 | 2.1082E−03 | −5.8320E−05 | 7.2348E−05 | −6.7161E−05 |
| S13 | 2.6626E−02 | 1.7931E−02 | −1.5757E−02 | −5.5942E−03 |
| S14 | −3.1432E−02 | 1.0454E−02 | −9.1323E−03 | 8.0161E−04 |
| S15 | −2.0878E−03 | 2.4123E−02 | −6.7630E−03 | 6.2949E−04 |
| S16 | 7.8330E−02 | −1.9822E−02 | 2.6613E−02 | −4.2126E−03 |

Figures 6A, 6B:
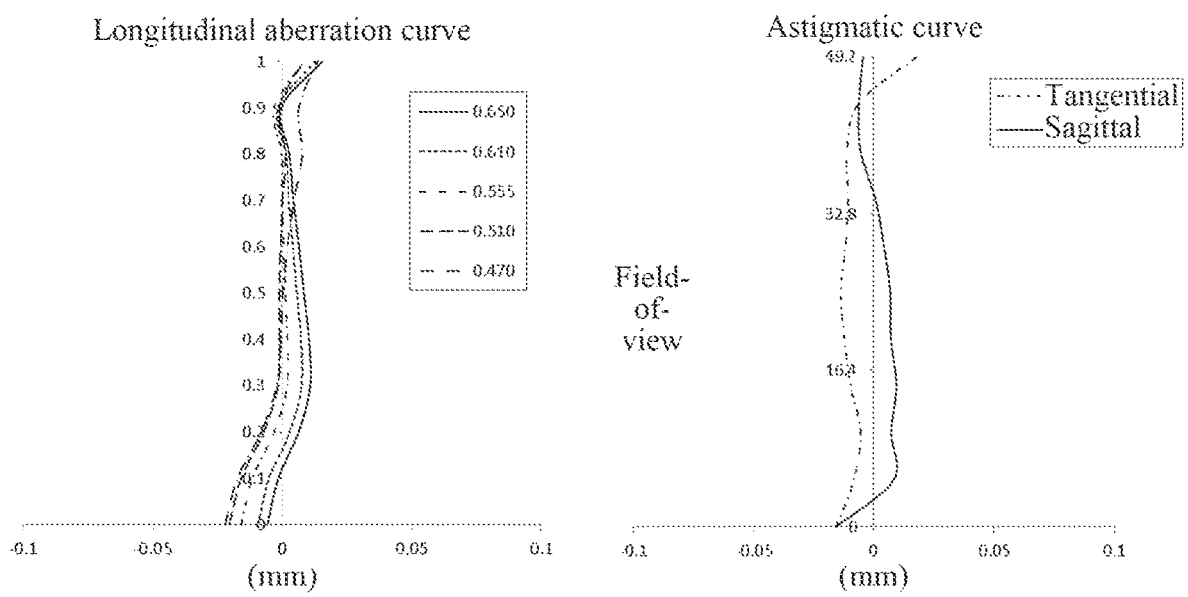
FIGS. 6A-6D respectively show a longitudinal aberration curve, an astigmatic curve, a distortion curve and a lateral color curve of the optical imaging lens assembly according to Embodiment 3.
Figures 6C, 6D:
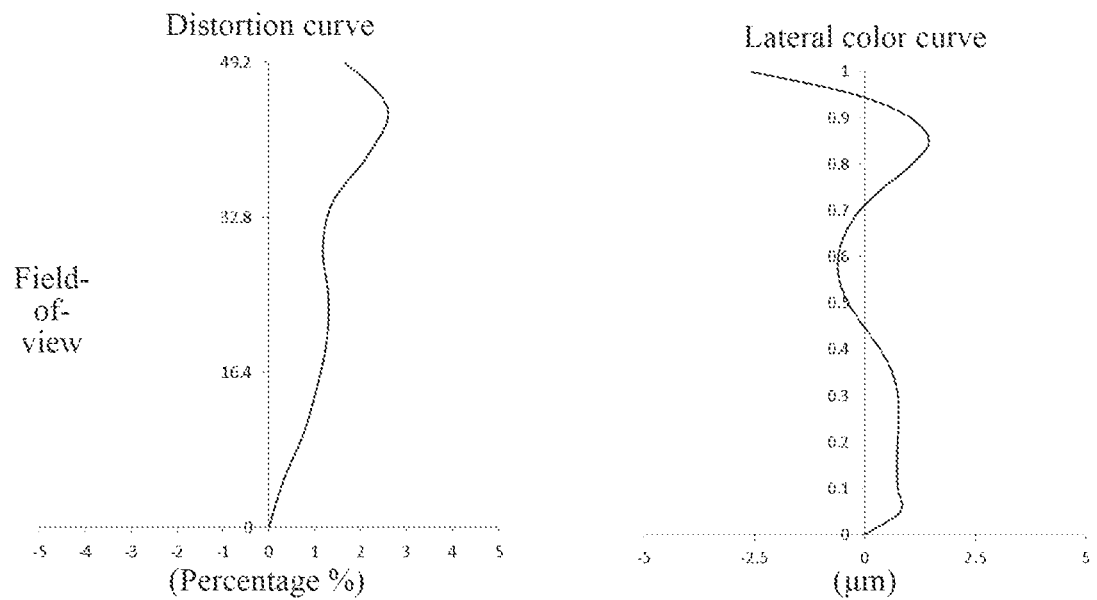

FIG. 6A illustrates a longitudinal aberration curve of the optical imaging lens assembly according to Embodiment 3, representing deviations of focal points of light of different wavelengths converged after passing through the lens assembly. FIG. 6B illustrates an astigmatic curve of the optical imaging lens assembly according to Embodiment 3, representing a curvature of a tangential image plane and a curvature of a sagittal image plane. FIG. 6C illustrates a distortion curve of the optical imaging lens assembly according to Embodiment 3, representing amounts of distortion corresponding to different fields-of-view. FIG. 6D illustrates a lateral color curve of the optical imaging lens assembly according to Embodiment 3, representing deviations of different image heights on the image plane after light passes through the lens assembly. It can be seen from FIGS. 6A-6D that the optical imaging lens assembly given in Embodiment 3 can achieve a good imaging quality.

Embodiment 4

Figure 7:
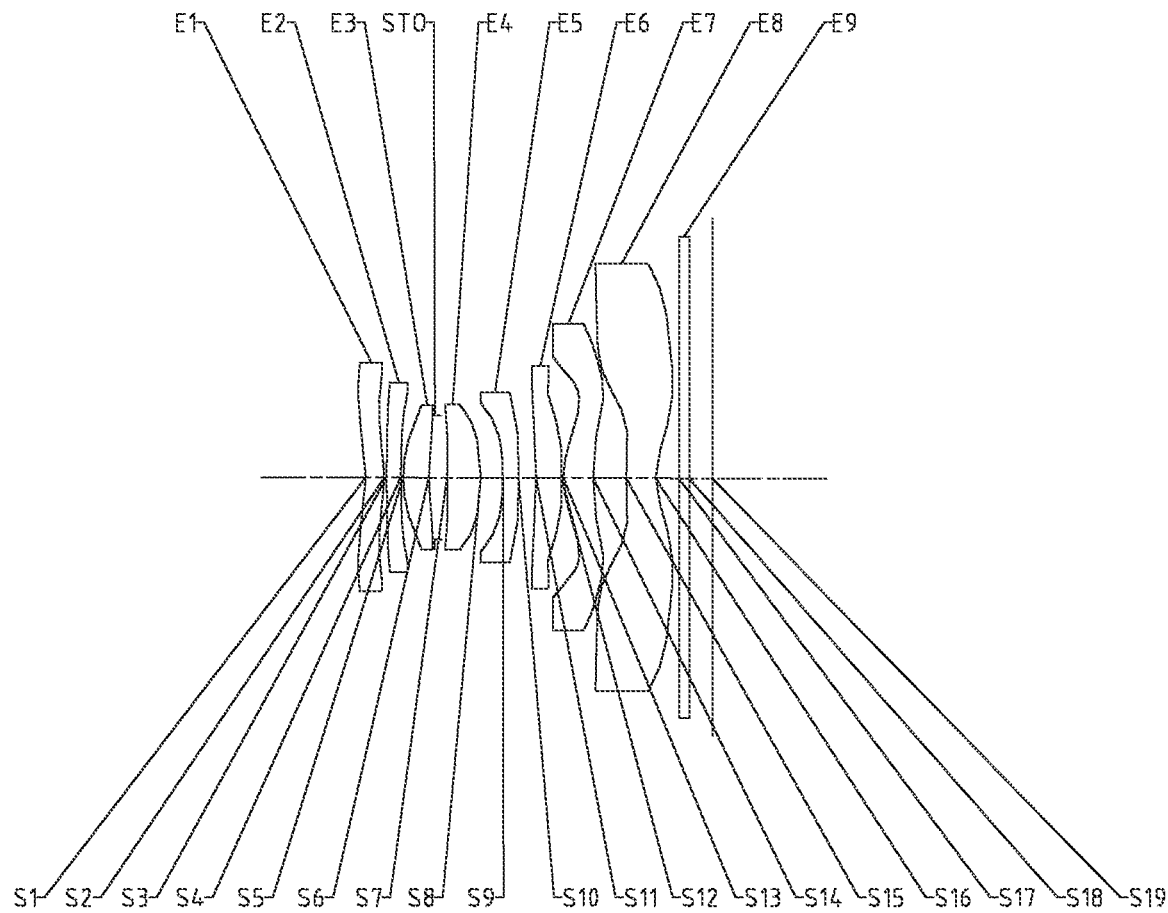
FIG. 7 is a schematic structural diagram of an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram of the optical imaging lens assembly according to Embodiment 4 of the present disclosure.

As shown in FIG. 7, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a concave surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a concave surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total effective focal length f of the optical imaging lens assembly is 4.61 mm, and a total track length TTL of the optical imaging lens assembly is 7.17 mm. Half of a diagonal length ImgH of an effective pixel area on the image plane S19 of the optical imaging lens assembly is 5.35 mm. Half of a maximal field-of-view Semi-FOV of the optical imaging lens assembly is 48.9°.

Table 7 shows basic parameters of the optical imaging lens assembly in Embodiment 4. Here, the units of a radius of curvature, a thickness/distance and a focal length are millimeters (mm). Table 8 shows the high-order coefficients A4, A6, A8, A10, A12, A14, A16, A18 and A20 applicable to the aspheric surfaces S1-S16 in Embodiment 4. Here, the surface type of each aspheric surface may be defined using the formula (1) given in Embodiment 1.

TABLE 7

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| S1 | aspheric | −4.1208 | 0.3831 | 1.55 | 56.1 | 220.00 | 0.4927 |
| S2 | aspheric | −4.1149 | 0.0500 | | | | 1.7410 |
| S3 | aspheric | 36.7826 | 0.2900 | 1.67 | 20.4 | −55.58 | −59.7883 |
| S4 | aspheric | 18.3980 | 0.0500 | | | | 86.3213 |
| S5 | aspheric | 2.7324 | 0.5337 | 1.55 | 56.1 | 9.10 | −2.1381 |
| S6 | aspheric | 5.6514 | 0.1182 | | | | −6.5494 |
| STO | spherical | infinite | 0.2568 | | | | |
| S7 | aspheric | 13.4144 | 0.6960 | 1.55 | 56.1 | 7.07 | 23.1911 |
| S8 | aspheric | −5.3242 | 0.4568 | | | | −6.9771 |
| S9 | aspheric | −8.6842 | 0.3250 | 1.68 | 19.2 | −11.39 | −3.6213 |
| S10 | aspheric | 70.0000 | 0.3682 | | | | 99.0000 |
| S11 | aspheric | −5.8927 | 0.5258 | 1.57 | 37.4 | −8.44 | −3.9882 |
| S12 | aspheric | 26.9957 | 0.0356 | | | | 98.8719 |
| S13 | aspheric | 1.8589 | 0.6200 | 1.55 | 56.1 | 3.64 | −11.5165 |
| S14 | aspheric | 25.3335 | 0.6791 | | | | −99.0000 |
| S15 | aspheric | 4.0724 | 0.6100 | 1.54 | 55.7 | −4.71 | −37.8743 |
| S16 | aspheric | 1.4780 | 0.4851 | | | | −0.9687 |
| S17 | spherical | infinite | 0.2100 | 1.52 | 64.2 | | |
| S18 | spherical | infinite | 0.4765 | | | | |
| S19 | spherical | infinite | | | | | |

TABLE 8

| surface number | A4 | A6 | A8 | A10 | A12 |
|---|---|---|---|---|---|
| S1 | 6.1570E−01 | −3.7024E−02 | 6.4968E−06 | −5.9585E−04 | −5.8857E−04 |
| S2 | 5.0573E−01 | −2.2180E−02 | 2.1648E−03 | −4.8014E−04 | −8.3468E−05 |
| S3 | −7.8276E−03 | 2.5284E−03 | 4.3891E−03 | 1.3423E−04 | 6.7717E−04 |
| S4 | 2.1076E−02 | 4.1571E−03 | 2.6024E−03 | 1.1889E−03 | 1.6866E−03 |
| S5 | 9.9109E−03 | −1.2362E−02 | −2.3056E−03 | 2.1819E−04 | 1.0912E−03 |
| S6 | −6.3631E−02 | 3.6153E−03 | −2.0501E−05 | 9.4769E−05 | 3.8958E−05 |
| S7 | −7.6750E−02 | −8.9131E−04 | 2.6470E−04 | 4.5456E−05 | 2.8042E−05 |
| S8 | −1.9808E−01 | −3.4744E−03 | −8.6476E−04 | −1.3728E−04 | 1.0439E−04 |
| S9 | −3.0746E−01 | 1.7068E−02 | 5.6332E−02 | −5.5117E−03 | 3.5730E−04 |
| S10 | −2.4014E−01 | 2.5198E−02 | 6.2533E−03 | 1.6052E−03 | 1.3571E−03 |
| S11 | 3.4497E−01 | −8.4118E−02 | −5.2185E−03 | −1.5352E−02 | −2.5146E−03 |
| S12 | −5.9952E−01 | 2.8218E−01 | −7.9886E−02 | 3.9965E−03 | −4.3862E−03 |
| S13 | −1.3648E+00 | 2.0531E−01 | 2.1977E−01 | −1.4494E−01 | −1.5128E−02 |
| S14 | −4.5103E−01 | −1.7521E−01 | 1.8274E−01 | −1.2559E−01 | 7.4180E−02 |
| S15 | −1.7423E+00 | 9.2731E−01 | −4.7236E−01 | 2.1670E−01 | −4.0644E−02 |
| S16 | −1.0538E+01 | 2.1608E+00 | −8.7945E−01 | 3.2498E−01 | −1.5942E−01 |

| surface number | A14 | A16 | A18 | A20 |
|---|---|---|---|---|
| S1 | 6.1297E−05 | −5.1745E−05 | 2.7378E−05 | 6.6089E−06 |
| S2 | −8.7624E−06 | −3.0209E−05 | 9.7035E−06 | 9.4142E−05 |
| S3 | −8.5086E−05 | 5.0663E−05 | 3.9655E−05 | 1.2165E−05 |
| S4 | 1.8665E−04 | 3.3508E−04 | 6.9947E−05 | 6.0541E−05 |
| S5 | 3.0219E−04 | 1.7858E−04 | 1.4555E−05 | 6.1102E−06 |
| S6 | 1.8425E−05 | 5.9186E−06 | −1.8988E−06 | 2.0170E−06 |
| S7 | 7.7167E−06 | 4.3871E−06 | 2.8980E−07 | 3.3884E−07 |
| S8 | 4.2759E−05 | 1.8083E−05 | 3.1347E−06 | 1.2691E−06 |
| S9 | −8.1249E−06 | −5.0738E−05 | −1.5111E−05 | −9.5228E−07 |
| S10 | 4.6937E−06 | 3.2598E−07 | 3.0617E−06 | 9.9945E−06 |
| S11 | −1.1041E−03 | −1.0783E−04 | −8.8967E−05 | 6.0172E−05 |
| S12 | 3.2939E−03 | 5.2242E−04 | −4.2703E−04 | −7.5634E−05 |
| S13 | 3.0366E−02 | 1.6445E−02 | −1.8311E−02 | −4.1622E−03 |
| S14 | −2.5440E−02 | 5.6183E−04 | −7.5514E−03 | 3.6489E−03 |
| S15 | −1.2982E−03 | 2.1995E−02 | −5.7636E−03 | −2.4127E−04 |
| S16 | 7.6084E−02 | −1.5621E−02 | 3.1732E−02 | 2.8215E−03 |

Figure 8A:
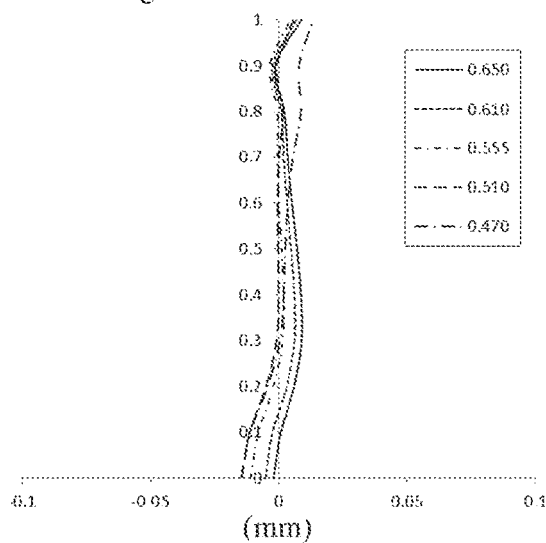
FIGS. 8A-8D respectively show a longitudinal aberration curve, an astigmatic curve, a distortion curve and a lateral color curve of the optical imaging lens assembly according to Embodiment 4.
Figure 8B:
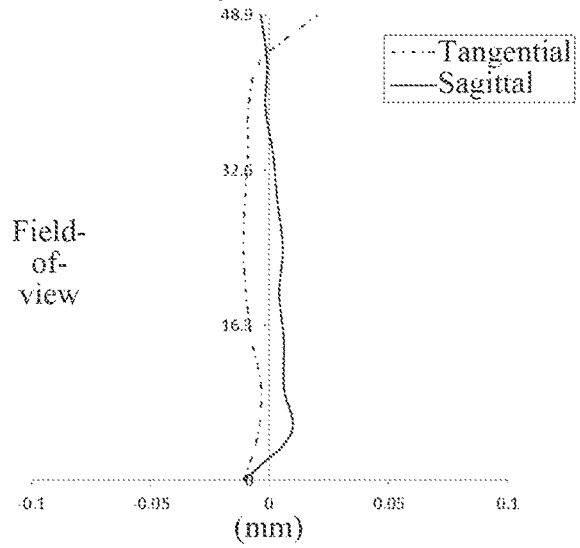
Figure 8C:
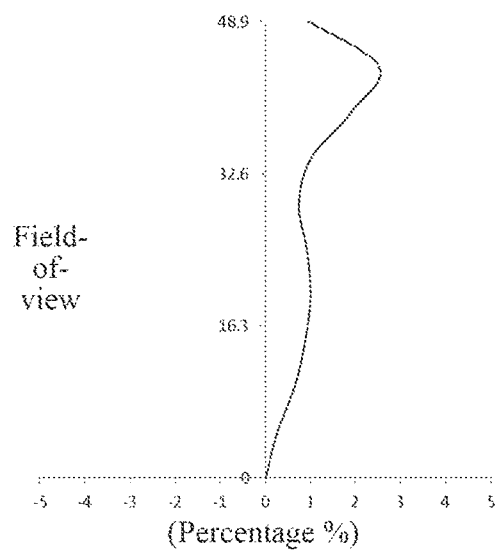
Figure 8D:
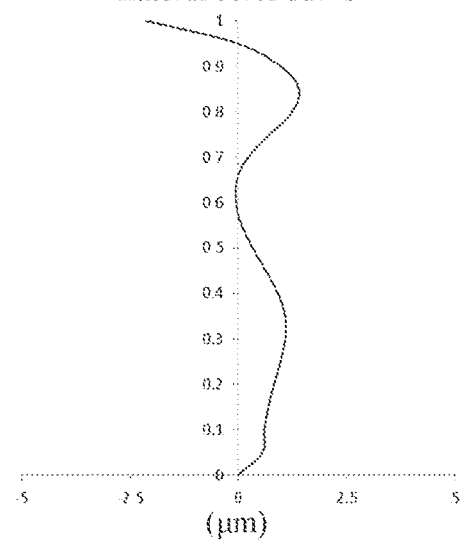

FIG. 8A illustrates a longitudinal aberration curve of the optical imaging lens assembly according to Embodiment 4, representing deviations of focal points of light of different wavelengths converged after passing through the lens assembly. FIG. 8B illustrates an astigmatic curve of the optical imaging lens assembly according to Embodiment 4, representing a curvature of a tangential image plane and a curvature of a sagittal image plane. FIG. 8C illustrates a distortion curve of the optical imaging lens assembly according to Embodiment 4, representing amounts of distortion corresponding to different fields-of-view. FIG. 8D illustrates a lateral color curve of the optical imaging lens assembly according to Embodiment 4, representing deviations of different image heights on the image plane after light passes through the lens assembly. It can be seen from FIGS. 8A-8D that the optical imaging lens assembly given in Embodiment 4 can achieve a good imaging quality.

Embodiment 5

Figure 9:
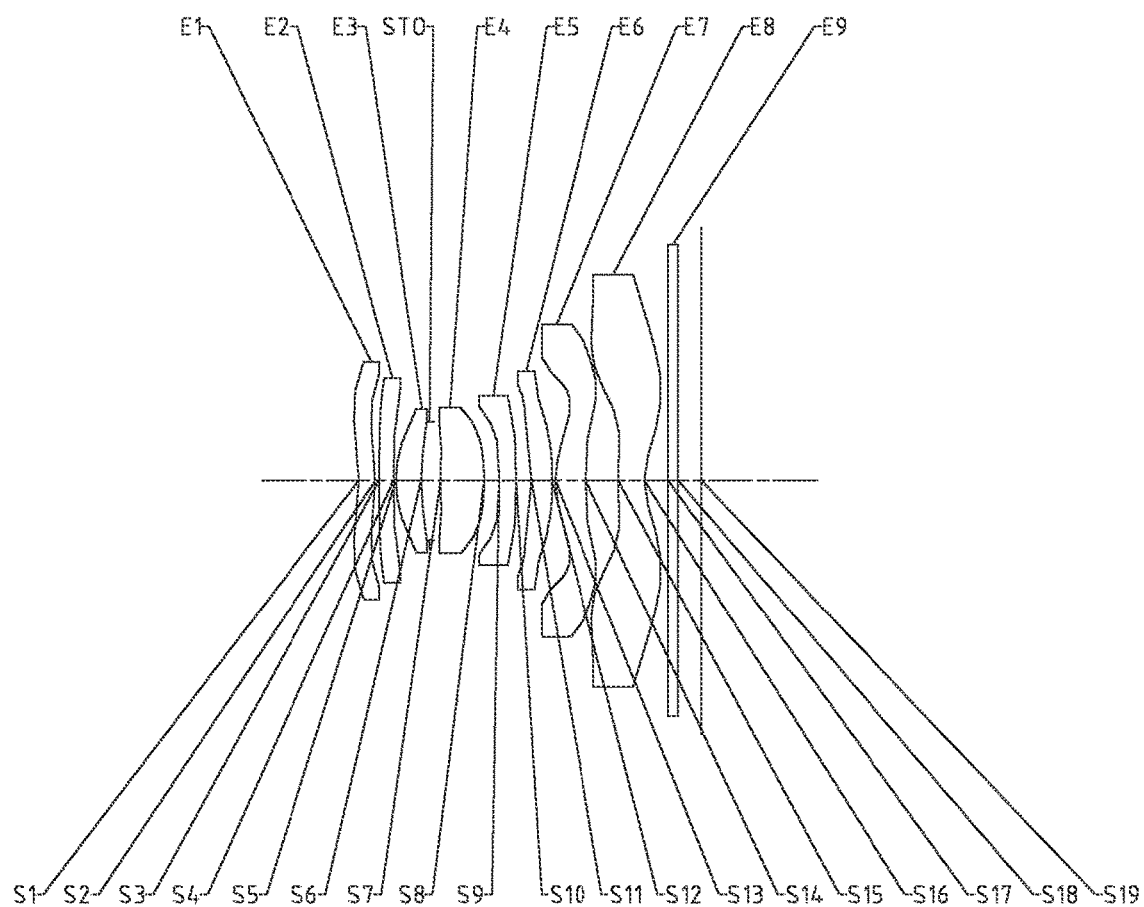
FIG. 9 is a schematic structural diagram of an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram of the optical imaging lens assembly according to Embodiment 5 of the present disclosure.

As shown in FIG. 9, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a positive refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total effective focal length f of the optical imaging lens assembly is 4.71 mm, and a total track length TTL of the optical imaging lens assembly is 7.26 mm. Half of a diagonal length ImgH of an effective pixel area on the image plane S19 of the optical imaging lens assembly is 5.35 mm. Half of a maximal field-of-view Semi-FOV of the optical imaging lens assembly is 49.4°.

Table 9 shows basic parameters of the optical imaging lens assembly in Embodiment 5. Here, the units of a radius of curvature, a thickness/distance and a focal length are millimeters (mm). Table 10 shows the high-order coefficients A4, A6, A8, A10, A12, A14, A16, A18 and A20 applicable to the aspheric surfaces S1-S16 in Embodiment 5. Here, the surface type of each aspheric surface may be defined using the formula (1) given in Embodiment 1.

TABLE 9

| surface number | surface type | radius of curvature | thickness/ distance | material refractive index | abbe number | focal length | conic coefficient |
|---|---|---|---|---|---|---|---|
| OBJ | spherical | infinite | infinite | | | | |
| S1 | aspheric | −4.7444 | 0.3505 | 1.55 | 56.1 | 244.44 | 0.3833 |
| S2 | aspheric | −4.7010 | 0.0797 | | | | 1.7907 |
| S3 | aspheric | 39.0214 | 0.3037 | 1.67 | 20.4 | −63.09 | 94.5308 |
| S4 | aspheric | 20.1770 | 0.0500 | | | | 91.9282 |
| S5 | aspheric | 2.4506 | 0.5337 | 1.55 | 56.1 | 8.89 | −2.0349 |
| S6 | aspheric | 4.5704 | 0.1798 | | | | −3.4784 |
| STO | spherical | infinite | 0.2364 | | | | |
| S7 | aspheric | 15.7885 | 0.9163 | 1.55 | 56.1 | 8.24 | 61.1969 |
| S8 | aspheric | −6.1671 | 0.3248 | | | | −1.0614 |
| S9 | aspheric | −17.6000 | 0.3500 | 1.68 | 19.2 | 171.01 | 24.5550 |
| S10 | aspheric | −15.4000 | 0.3314 | | | | −99.0000 |
| S11 | aspheric | −3.0820 | 0.4297 | 1.57 | 37.4 | −5.19 | −3.2693 |
| S12 | aspheric | 75.3840 | 0.0742 | | | | 6.7873 |
| S13 | aspheric | 2.1359 | 0.6500 | 1.55 | 56.1 | 3.60 | −12.7950 |
| S14 | aspheric | −21.8925 | 0.6893 | | | | −21.9469 |
| S15 | aspheric | 4.5343 | 0.5500 | 1.54 | 55.7 | −4.53 | −31.5725 |
| S16 | aspheric | 1.5154 | 0.5020 | | | | −0.9824 |
| S17 | spherical | infinite | 0.2100 | 1.52 | 64.2 | | |
| S18 | spherical | infinite | 0.4935 | | | | |
| S19 | spherical | infinite | | | | | |

TABLE 10

| surface number | A4 | A6 | A8 | A10 | A12 |
|---|---|---|---|---|---|
| S1 | 8.9337E−01 | −5.8270E−02 | −3.3425E−03 | −5.5425E−03 | −6.5433E−04 |
| S2 | 7.9893E−01 | −4.4843E−02 | −2.9122E−03 | −3.6067E−03 | 1.3390E−03 |
| S3 | 1.8584E−02 | 8.1073E−03 | 3.7594E−03 | 6.5914E−04 | 1.3644E−03 |
| S4 | 1.6092E−02 | −1.9176E−03 | −2.4902E−03 | 6.2195E−05 | 5.3414E−04 |
| S5 | 1.6037E−02 | −1.0715E−02 | −4.1379E−03 | −6.1143E−04 | 2.4877E−04 |
| S6 | −5.1025E−02 | 2.0860E−03 | −3.4372E−04 | 3.9849E−05 | 5.4082E−05 |
| S7 | −8.6552E−02 | −3.6030E−03 | −4.8893E−04 | −6.8659E−05 | 2.7573E−05 |
| S8 | −2.7490E−01 | −3.9642E−04 | −2.9201E−03 | −1.1654E−03 | 6.6771E−05 |
| S9 | −3.5145E−01 | 1.1488E−02 | 4.1990E−03 | −3.1307E−03 | 4.1643E−04 |
| S10 | −9.8295E−02 | −1.1736E−02 | 1.5029E−02 | −4.2997E−03 | 1.6007E−03 |
| S11 | 3.7378E−01 | −1.1275E−01 | 9.1490E−03 | 2.2950E−04 | −2.3644E−03 |
| S12 | −5.6720E−01 | 2.3418E−01 | −6.6968E−02 | 1.2449E−02 | −8.8794E−03 |
| S13 | −8.7937E−01 | −1.3985E−01 | 1.5497E−01 | 7.5801E−03 | −6.5150E−03 |
| S14 | 2.2600E−01 | −4.2792E−01 | 2.3715E−01 | −1.3904E−01 | 3.7259E−02 |
| S15 | −1.6920E+00 | 9.0388E−01 | −4.3230E−01 | 1.4887E−01 | −2.5109E−02 |
| S16 | −8.1518E+00 | 1.8402E+00 | −5.6904E−01 | 2.0745E−01 | −8.4956E−02 |

| surface number | A14 | A16 | A18 | A20 |
|---|---|---|---|---|
| S1 | 3.1332E−04 | 1.3911E−04 | 1.3263E−04 | 4.1054E−05 |
| S2 | 1.0940E−03 | 3.2754E−04 | 1.5495E−04 | 2.9498E−05 |
| S3 | 2.2003E−04 | 3.0015E−04 | 1.7723E−04 | 1.5697E−05 |
| S4 | −5.2471E−05 | 1.8646E−04 | 5.8792E−05 | 2.5293E−05 |
| S5 | 1.1963E−04 | 7.5785E−05 | 3.3374E−05 | 5.8080E−06 |
| S6 | 1.8920E−05 | 8.3606E−06 | −2.1221E−06 | 3.7868E−07 |
| S7 | 2.7297E−05 | 1.4888E−05 | 8.5056E−06 | 7.7223E−07 |
| S8 | −2.1747E−05 | −9.7743E−06 | −8.8526E−06 | 7.9087E−07 |
| S9 | 1.0231E−04 | −1.8255E−04 | −4.4874E−05 | −1.6243E−05 |
| S10 | 1.8383E−04 | −1.2276E−04 | −6.0506E−06 | −1.2522E−05 |
| S11 | −6.2479E−04 | −5.2774E−04 | −2.3255E−04 | −2.4094E−05 |
| S12 | 9.9955E−04 | 9.8149E−04 | 1.4223E−04 | −1.1626E−04 |
| S13 | −1.4305E−02 | 4.7964E−04 | 2.3718E−03 | 1.2020E−03 |
| S14 | −1.2617E−02 | 8.8523E−03 | −2.0673E−03 | 4.0899E−04 |
| S15 | −9.5635E−03 | 9.2509E−03 | −9.4170E−04 | −2.1773E−03 |
| S16 | 3.8981E−02 | −2.2718E−02 | 1.3579E−02 | −4.1479E−03 |

Figure 10A:
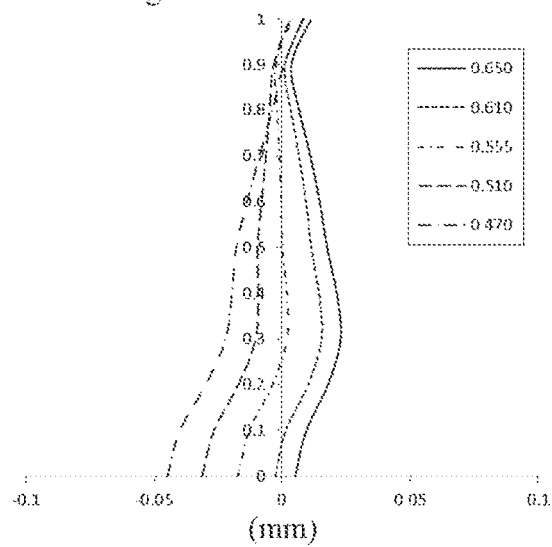
FIGS. 10A-10D respectively show a longitudinal aberration curve, an astigmatic curve, a distortion curve and a lateral color curve of the optical imaging lens assembly according to Embodiment 5.
Figure 10B:
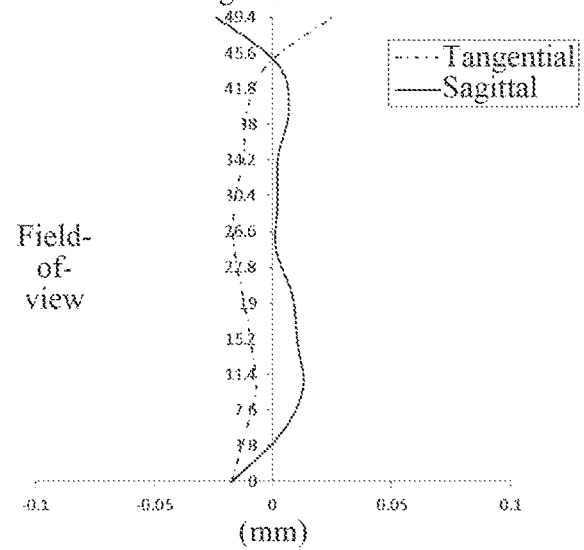
Figure 10C:
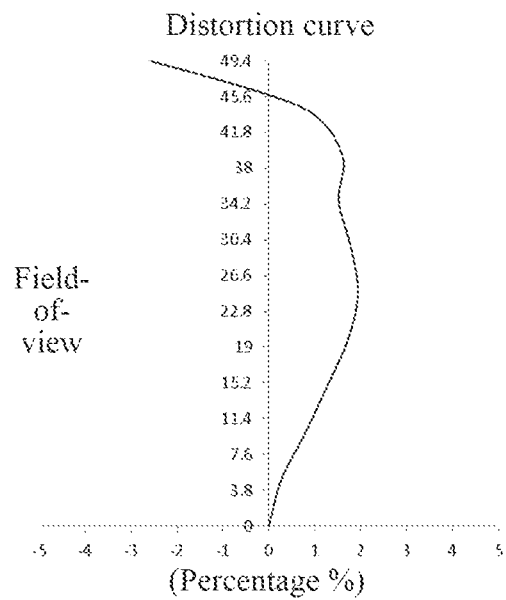
Figure 10D:
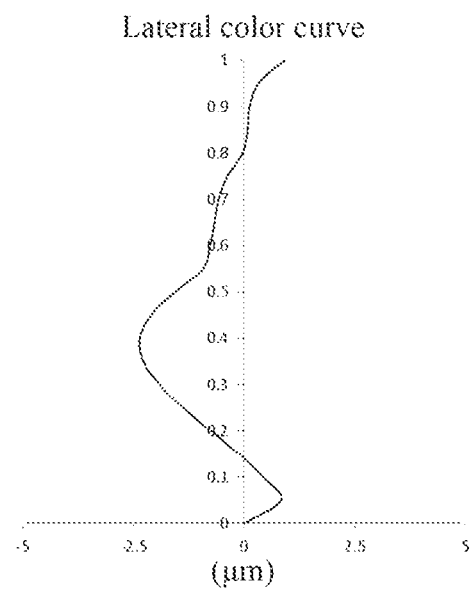

FIG. 10A illustrates a longitudinal aberration curve of the optical imaging lens assembly according to Embodiment 5, representing deviations of focal points of light of different wavelengths converged after passing through the lens assembly. FIG. 10B illustrates an astigmatic curve of the optical imaging lens assembly according to Embodiment 5, representing a curvature of a tangential image plane and a curvature of a sagittal image plane. FIG. 10C illustrates a distortion curve of the optical imaging lens assembly according to Embodiment 5, representing amounts of distortion corresponding to different fields-of-view. FIG. 10D illustrates a lateral color curve of the optical imaging lens assembly according to Embodiment 5, representing deviations of different image heights on the image plane after light passes through the lens assembly. It can be seen from FIGS. 10A-10D that the optical imaging lens assembly given in Embodiment 5 can achieve a good imaging quality.

Embodiment 6

Figure 11:
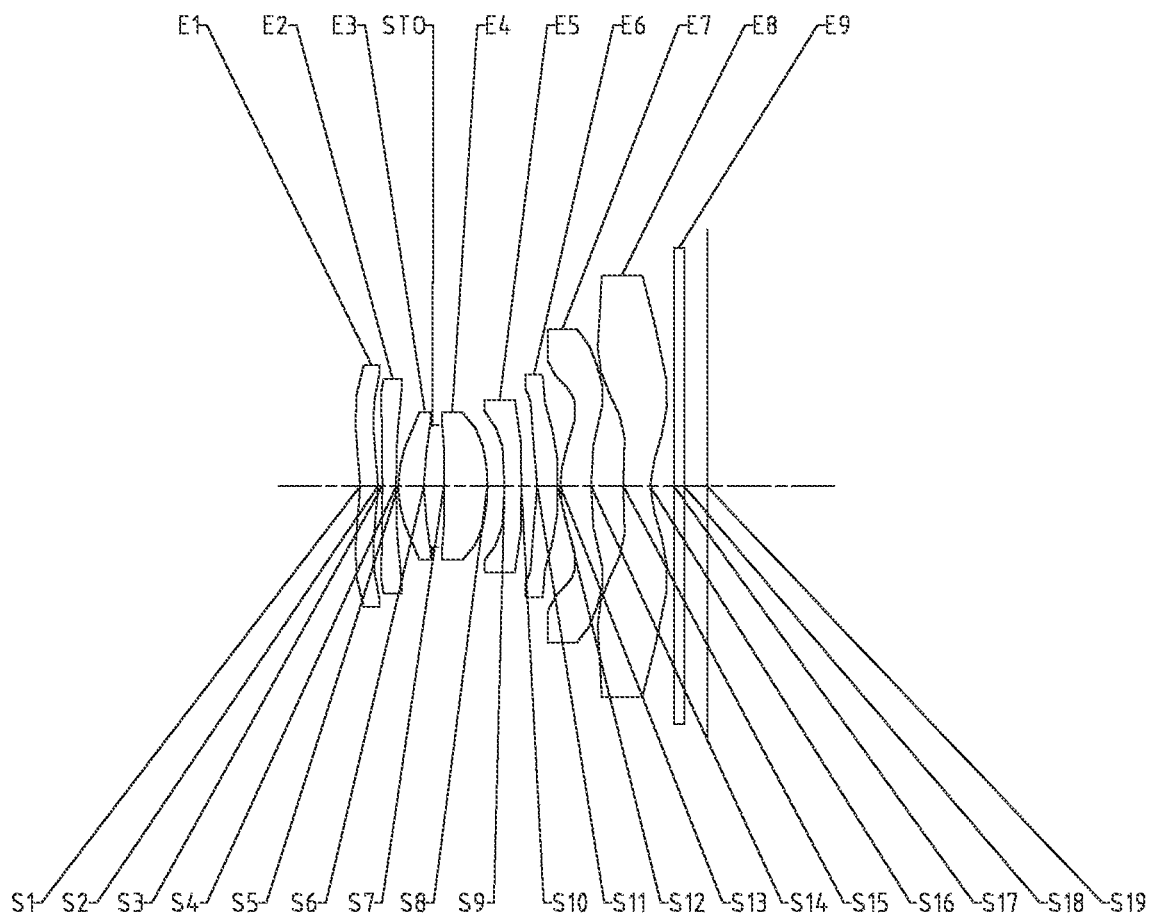
FIG. 11 is a schematic structural diagram of an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram of the optical imaging lens assembly according to Embodiment 6 of the present disclosure.

As shown in FIG. 11, the optical imaging lens assembly may include, sequentially from an object side to an image side, a first lens E1, a second lens E2, a third lens E3, a diaphragm STO, a fourth lens E4, a fifth lens E5, a sixth lens E6, a seventh lens E7, an eighth lens E8, an optical filter E9 and an image plane S19.

The first lens E1 has a positive refractive power, an object-side surface S1 of the first lens E1 is a concave surface, and an image-side surface S2 of the first lens E1 is a convex surface. The second lens E2 has a negative refractive power, an object-side surface S3 of the second lens E2 is a convex surface, and an image-side surface S4 of the second lens E2 is a concave surface. The third lens E3 has a positive refractive power, an object-side surface S5 of the third lens E3 is a convex surface, and an image-side surface S6 of the third lens E3 is a concave surface. The fourth lens E4 has a positive refractive power, an object-side surface S7 of the fourth lens E4 is a convex surface, and an image-side surface S8 of the fourth lens E4 is a convex surface. The fifth lens E5 has a negative refractive power, an object-side surface S9 of the fifth lens E5 is a concave surface, and an image-side surface S10 of the fifth lens E5 is a convex surface. The sixth lens E6 has a negative refractive power, an object-side surface S11 of the sixth lens E6 is a concave surface, and an image-side surface S12 of the sixth lens E6 is a concave surface. The seventh lens E7 has a positive refractive power, an object-side surface S13 of the seventh lens E7 is a convex surface, and an image-side surface S14 of the seventh lens E7 is a convex surface. The eighth lens E8 has a negative refractive power, an object-side surface S9 of the eighth lens E8 is a convex surface, and an image-side surface S10 of the eighth lens E8 is a concave surface. The optical filter E9 has an object-side surface S17 and an image-side surface S18. Light from a photographed object sequentially passes through the surfaces S1-S18 and finally forms an image on the image plane S19.

In this example, a total effective focal length f of the optical imaging lens assembly is 4.74 mm, and a total track length TTL of the optical imaging lens assembly is 7.30 mm. Half of a diagonal length ImgH of an effective pixel area on the image plane S19 of the optical imaging lens assembly is 5.35 mm. Half of a maximal field-of-view Semi-FOV of the optical imaging lens assembly is 48.8°.

Table 11 shows basic parameters of the optical imaging lens assembly in Embodiment 6. Here, the units of a radius of curvature, a thickness/distance and a focal length are millimeters (mm). Table 12 shows the high-order coefficients A4, A6, A8, A10, A12, A14, A16, A18 and A20 applicable to the aspheric surfaces S1-S16 in Embodiment 6. Here, the surface type of each aspheric surface may be defined using the formula (1) given in Embodiment 1.

TABLE 11

| surface number | surface type | radius of curvature | thickness/ distance | refractive index | abbe number | focal length | conic coefficient |
|---|---|---|---|---|---|---|---|
| OBJ | spherical | infinite | infinite | | | | |
| S1 | aspheric | −4.8461 | 0.3779 | 1.55 | 56.1 | 53.35 | 0.6663 |
| S2 | aspheric | −4.2692 | 0.0869 | | | | 1.7202 |
| S3 | aspheric | −60.0000 | 0.2900 | 1.67 | 20.4 | −28.32 | −56.1366 |
| S4 | aspheric | 27.5927 | 0.0500 | | | | 99.0000 |
| S5 | aspheric | 2.4251 | 0.5337 | 1.55 | 56.1 | 8.80 | −2.0788 |
| S6 | aspheric | 4.5168 | 0.1846 | | | | −3.3660 |
| STO | spherical | infinite | 0.2329 | | | | |
| S7 | aspheric | 15.3415 | 0.9148 | 1.55 | 56.1 | 7.27 | 51.6036 |
| S8 | aspheric | −5.2427 | 0.3644 | | | | −2.7671 |
| S9 | aspheric | −18.0499 | 0.3500 | 1.68 | 19.2 | −38.79 | −4.3238 |
| S10 | aspheric | −58.1900 | 0.3344 | | | | 99.0000 |
| S11 | aspheric | −3.3987 | 0.4290 | 1.57 | 37.4 | −5.35 | −3.5937 |
| S12 | aspheric | 30.7891 | 0.0540 | | | | −5.1279 |
| S13 | aspheric | 2.0284 | 0.6500 | 1.55 | 56.1 | 3.53 | −11.9683 |
| S14 | aspheric | −33.7987 | 0.6741 | | | | 32.2303 |
| S15 | aspheric | 4.2516 | 0.5651 | 1.54 | 55.7 | −4.63 | −26.9532 |
| S16 | aspheric | 1.4955 | 0.5034 | | | | −0.9791 |
| S17 | spherical | infinite | 0.2100 | 1.52 | 64.2 | | |
| S18 | spherical | infinite | 0.4949 | | | | |
| S19 | spherical | infinite | | | | | |

TABLE 12

| surface number | A4 | A6 | A8 | A10 | A12 |
|---|---|---|---|---|---|
| S1 | 8.9047E−01 | −6.3229E−02 | −7.0505E−03 | −6.5685E−03 | −6.9555E−04 |
| S2 | 8.9684E−01 | −5.0055E−02 | 1.4122E−03 | −1.5490E−03 | 3.0227E−03 |
| S3 | 2.5655E−02 | 8.2485E−03 | 5.3134E−03 | 1.8988E−03 | 1.9767E−03 |
| S4 | 1.8153E−02 | 1.6359E−03 | −1.4342E−03 | 1.0497E−03 | 6.9553E−04 |
| S5 | 1.1877E−02 | −1.3504E−02 | −4.0487E−03 | −9.7300E−05 | 5.4641E−04 |
| S6 | −5.3434E−02 | 3.1042E−03 | −1.7198E−04 | 2.3933E−04 | 1.3097E−04 |
| S7 | −9.2776E−02 | −3.1293E−03 | −1.8278E−04 | 5.6531E−05 | 6.0948E−05 |
| S8 | −2.6631E−01 | −1.8183E−03 | −2.9143E−03 | −8.1265E−04 | 8.8896E−05 |
| S9 | −3.4412E−01 | 1.2338E−02 | 2.2562E−03 | −2.9721E−03 | 5.3474E−04 |
| S10 | −1.1014E−01 | −9.4228E−03 | 1.3335E−02 | −1.1041E−03 | 1.8473E−03 |
| S11 | 3.9197E−01 | −1.1797E−01 | 1.0143E−02 | −3.8219E−03 | −1.7319E−03 |
| S12 | −5.7579E−01 | 2.4285E−01 | −7.4087E−02 | 1.2333E−02 | −7.1767E−03 |
| S13 | −8.8439E−01 | −1.3210E−01 | 1.6347E−01 | 5.3414E−03 | −6.8378E−03 |
| S14 | 1.8183E−01 | −4.2178E−01 | 2.3909E−01 | −1.4030E−01 | 3.9208E−02 |
| S15 | −1.6849E+00 | 8.9700E−01 | −4.3259E−01 | 1.4949E−01 | −2.7248E−02 |
| S16 | −8.3966E+00 | 1.9161E+00 | −6.1359E−01 | 2.2049E−01 | −9.0844E−02 |

| surface number | A14 | A16 | A18 | A20 |
|---|---|---|---|---|
| S1 | 5.7090E−04 | 3.6694E−04 | 2.2028E−04 | 7.0130E−05 |
| S2 | 1.6998E−03 | 4.7869E−04 | 1.8879E−04 | 2.1325E−05 |
| S3 | 5.4428E−04 | 3.9643E−04 | 2.3724E−04 | −2.4914E−05 |
| S4 | 4.2737E−05 | 1.6847E−04 | 9.1857E−05 | 1.2854E−05 |
| S5 | 2.5526E−04 | 1.1016E−04 | 4.5811E−05 | 1.4528E−05 |
| S6 | 5.2000E−05 | 1.4566E−05 | 1.6226E−06 | −7.5978E−07 |
| S7 | 2.3458E−05 | 7.0252E−06 | −4.4724E−08 | −1.4653E−06 |
| S8 | −1.4573E−05 | 1.2724E−05 | 1.1281E−06 | 3.5562E−06 |
| S9 | −3.5826E−05 | −1.2402E−04 | −2.1291E−05 | −8.4153E−06 |
| S10 | 1.5071E−05 | −3.9611E−05 | 1.3054E−05 | −5.2461E−06 |
| S11 | −5.9491E−04 | −4.3198E−04 | −1.7859E−04 | −2.2159E−05 |
| S12 | 1.7948E−03 | 7.5078E−04 | −1.3080E−04 | −6.2217E−05 |
| S13 | −1.5529E−02 | 9.7482E−04 | 2.6142E−03 | 1.4677E−03 |
| S14 | −1.4331E−02 | 9.8304E−03 | −2.2653E−03 | 9.4114E−04 |
| S15 | −9.9657E−03 | 1.0270E−02 | −1.8500E−03 | −1.7023E−03 |
| S16 | 3.8693E−02 | −2.3119E−02 | 1.4681E−02 | −5.2366E−03 |

Figure 12A:
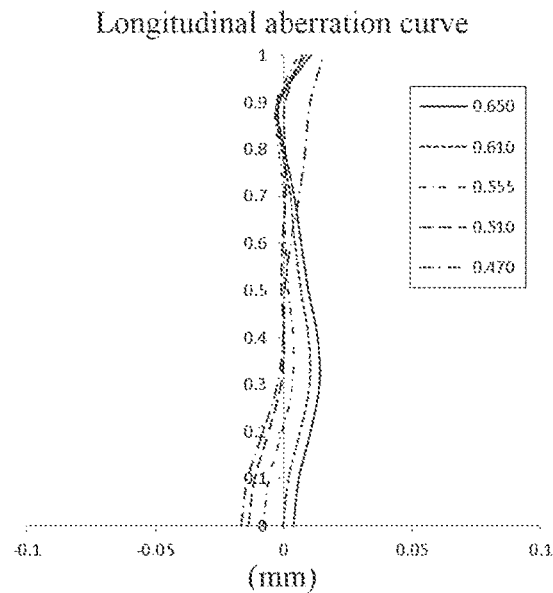
FIGS. 12A-12D respectively show a longitudinal aberration curve, an astigmatic curve, a distortion curve and a lateral color curve of the optical imaging lens assembly according to Embodiment 6.
Figure 12B:
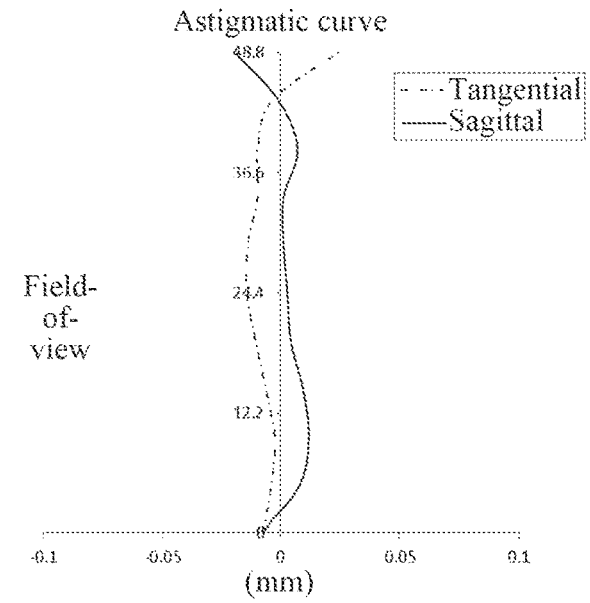
Figure 12C:
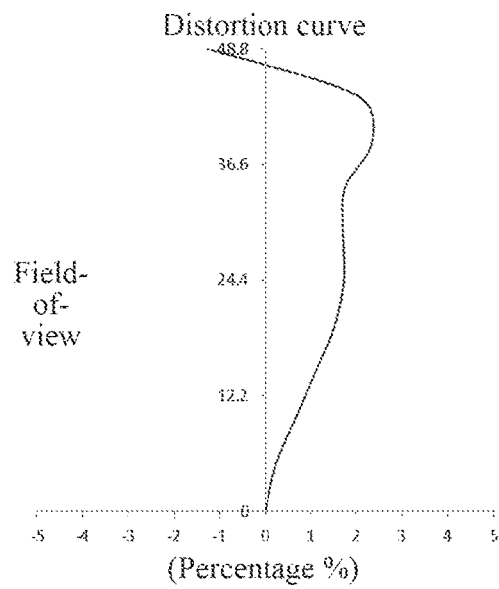
Figure 12D:
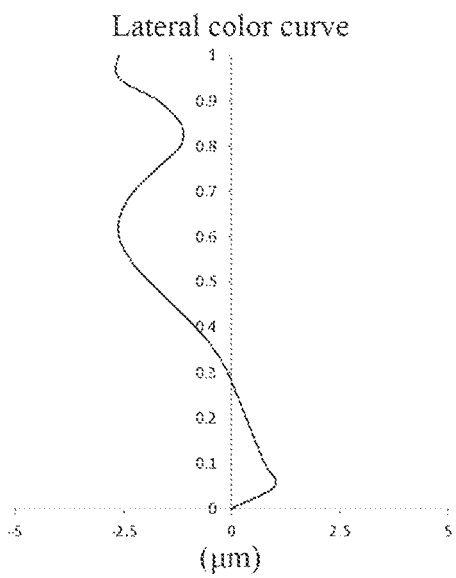

FIG. 12A illustrates a longitudinal aberration curve of the optical imaging lens assembly according to Embodiment 6, representing deviations of focal points of light of different wavelengths converged after passing through the lens assembly. FIG. 12B illustrates an astigmatic curve of the optical imaging lens assembly according to Embodiment 6, representing a curvature of a tangential image plane and a curvature of a sagittal image plane. FIG. 12C illustrates a distortion curve of the optical imaging lens assembly according to Embodiment 6, representing amounts of distortion corresponding to different fields-of-view. FIG. 12D illustrates a lateral color curve of the optical imaging lens assembly according to Embodiment 6, representing deviations of different image heights on the image plane after light passes through the lens assembly. It can be seen from FIGS. 12A-12D that the optical imaging lens assembly given in Embodiment 6 can achieve a good imaging quality.

In summary, Embodiments 1-6 respectively satisfy the relationships shown in Table 13.

TABLE 13

| conditional expression | embodiment | | | | | |
| --- | --- | --- | --- | --- | --- | --- |
| | 1 | 2 | 3 | 4 | 5 | 6 |
| f1/f2 | −6.07 | −3.70 | −3.45 | −3.96 | −3.87 | −1.88 |
| R4/f3 | 2.40 | 2.11 | 1.93 | 2.02 | 2.27 | 3.14 |
| f4/R5 | 3.08 | 2.61 | 2.41 | 2.59 | 3.36 | 3.00 |
| f6/R11 | 1.88 | 1.46 | 1.51 | 1.43 | 1.68 | 1.57 |
| f/f7 | 1.25 | 1.25 | 1.28 | 1.27 | 1.31 | 1.34 |
| f8/R16 | −3.21 | −3.49 | −3.55 | −3.19 | −2.99 | −3.10 |
| R9/R8 | 1.53 | 1.37 | 1.42 | 1.63 | 2.85 | 3.44 |
| R13/CT7 | 3.47 | 3.21 | 3.16 | 3.00 | 3.29 | 3.12 |
| R11/CT6 | −9.16 | −11.43 | −10.03 | −11.21 | −7.17 | −7.92 |
| R7/R6 | 3.91 | 3.28 | 2.59 | 2.37 | 3.45 | 3.40 |
| TTL/ΣAT | 3.48 | 3.44 | 3.72 | 3.56 | 3.69 | 3.68 |
| T78/T56 | 1.62 | 1.54 | 1.53 | 1.84 | 2.08 | 2.02 |
| CT4/CT5 | 2.02 | 2.65 | 2.10 | 2.14 | 2.62 | 2.61 |
| f/EPD | 1.9 | 1.85 | 1.83 | 1.85 | 1.89 | 1.89 |
| FOV (°) | 96.1 | 97.9 | 98.5 | 97.9 | 98.9 | 97.6 |

The present disclosure further provides a camera apparatus having an electronic photosensitive element which may be a charge coupled device (CCD) or complementary metal-oxide semiconductor element (CMOS). The camera apparatus may be an independent camera device such as a digital camera, or may be a camera module integrated in a mobile electronic device such as a mobile phone. The camera apparatus is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. An optical imaging lens assembly, comprising, sequentially along an optical axis from an object side to an image side:

a first lens, having a positive refractive power, an object-side surface of the first lens being a concave surface;

a second lens, having a negative refractive power, an image-side surface of the second lens being a convex surface;

a third lens, having a refractive power;

a fourth lens, having a refractive power;

a fifth lens, having a refractive power;

a sixth lens, having a refractive power;

a seventh lens, having a refractive power; and an eighth lens, having a refractive power;

wherein 1.0<f6/R11<2.0, wherein f6 is an effective focal length of the sixth lens, and R11 is a radius of curvature of an object-side surface of the sixth lens.

2. The optical imaging lens assembly according to claim 1, wherein |ODT|<2.6%, wherein ODT is an optical distortion of the optical imaging lens assembly.

3. The optical imaging lens assembly according to claim 1, wherein −6.5<f1/f2<−1.5, wherein f1 is an effective focal length of the first lens, and f2 is an effective focal length of the second lens.

4. The optical imaging lens assembly according to claim 1, wherein 1.5<R4/f3<3.5, wherein R4 is a radius of curvature of the image-side surface of the second lens, and f3 is an effective focal length of the third lens.

5. The optical imaging lens assembly according to claim 1, wherein 2.0<f4/R5<3.5, wherein f4 is an effective focal length of the fourth lens, and R5 is a radius of curvature of an object-side surface of the third lens.

6. The optical imaging lens assembly according to claim 1, wherein 1.0<R9/R8<3.5, wherein R8 is a radius of curvature of an image-side surface of the fourth lens, and R9 is a radius of curvature of an object-side surface of the fifth lens.

7. The optical imaging lens assembly according to claim 1, wherein 3.0≤R13/CT7<3.5, wherein R13 is a radius of curvature of an object-side surface of the seventh lens, and CT7 is a center thickness of the seventh lens along the optical axis.

8. The optical imaging lens assembly according to claim 1, wherein −12.0<R11/CT6<−7.0, wherein R11 is the radius of curvature of the object-side surface of the sixth lens, and CT6 is a center thickness of the sixth lens along the optical axis.

9. The optical imaging lens assembly according to claim 1, wherein 2.0<R7/R6<4.0, wherein R6 is a radius of curvature of an image-side surface of the third lens, and R7 is a radius of curvature of an object-side surface of the fourth lens.

10. The optical imaging lens assembly according to claim 1, wherein 1.5<T78/T56<2.1, wherein T56 is a spacing distance between the fifth lens and the sixth lens along the optical axis, and T78 is a spacing distance between the seventh lens and the eighth lens along the optical axis.

11. The optical imaging lens assembly according to claim 1, wherein 2.0<CT4/CT5<3.0, wherein CT4 is a center thickness of the fourth lens along the optical axis, and CT5 is a center thickness of the fifth lens along the optical axis.

12. The optical imaging lens assembly according to claim 1, wherein 3.0<TTL/ΣAT<4.0, wherein TTL is a distance from the object-side surface of the first lens to an image plane of the optical imaging lens assembly along the optical axis, and ΣAT is a sum of spacing distances between any two adjacent lenses in the first lens to the eighth lens along the optical axis.

13. The optical imaging lens assembly according to claim 1, wherein f/EPD<2.1, wherein f is the total effective focal length of the optical imaging lens assembly, and EPD is an entrance pupil diameter of the optical imaging lens assembly.

14. The optical imaging lens assembly according to claim 1, wherein FOV>90°, wherein FOV is a maximal field-of-view of the optical imaging lens assembly.

15. The optical imaging lens assembly according to claim 1, wherein ImgH>5.0 mm, wherein ImgH is half of a diagonal length of an effective pixel area on the image plane of the optical imaging lens assembly.

16. An optical imaging lens assembly, comprising, sequentially along an optical axis from an object side to an image side:
   a first lens, having a positive refractive power, an object-side surface of the first lens being a concave surface;
   a second lens, having a negative refractive power, an image-side surface of the second lens being a convex surface;
   a third lens, having a refractive power;
   a fourth lens, having a refractive power;
   a fifth lens, having a refractive power;
   a sixth lens, having a refractive power;
   a seventh lens, having a refractive power; and
   an eighth lens, having a refractive power;
   wherein $1.0<f/f7<1.5$, wherein f is a total effective focal length of the optical imaging lens assembly, and f7 is an effective focal length of the seventh lens.

17. An optical imaging lens assembly, comprising, sequentially along an optical axis from an object side to an image side:
   a first lens, having a positive refractive power, an object-side surface of the first lens being a concave surface;
   a second lens, having a negative refractive power, an image-side surface of the second lens being a convex surface;
   a third lens, having a refractive power;
   a fourth lens, having a refractive power;
   a fifth lens, having a refractive power;
   a sixth lens, having a refractive power;
   a seventh lens, having a refractive power; and
   an eighth lens, having a refractive power;
   wherein $-4.0<f8/R16<-2.5$, wherein f8 is an effective focal length of the eighth lens, and R16 is a radius of curvature of an image-side surface of the eighth lens.

* * * * *